(12) United States Patent
Kobayashi et al.

(10) Patent No.: US 6,602,563 B2
(45) Date of Patent: Aug. 5, 2003

(54) LIQUID CRYSTAL DISPLAY

(75) Inventors: Nobuyuki Kobayashi, Kobe (JP); Takeshi Kitahora, Osaka (JP); Fumie Motoori, Ibaraki (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 150 days.

(21) Appl. No.: 09/859,906

(22) Filed: May 17, 2001

(65) Prior Publication Data

US 2002/0015132 A1 Feb. 7, 2002

(30) Foreign Application Priority Data

May 22, 2000 (JP) ........................................ 2000-150185

(51) Int. Cl.[7] .................. C09K 19/20; C09K 19/12; C09K 19/30; C09K 19/54; G02F 1/1343; G09G 3/36

(52) U.S. Cl. ..................... 428/1.3; 428/1.1; 252/299.5; 252/299.61; 252/299.66; 252/299.67; 349/35; 349/143; 349/169; 349/185; 345/87

(58) Field of Search ............. 428/1.1, 1.3; 252/299.01, 252/299.4, 299.5, 299.67, 299.66, 299.61; 349/35, 106, 143, 169, 185; 345/87

(56) References Cited

U.S. PATENT DOCUMENTS

| 5,748,277 | A |   | 5/1998 | Huang et al. ............... 349/169 |
| 6,124,908 | A | * | 9/2000 | Kobayashi et al. ......... 349/106 |
| 6,274,208 | B1 | * | 8/2001 | Iwamatsu et al. ............ 428/1.1 |
| 6,287,647 | B1 | * | 9/2001 | Kobayashi et al. .......... 428/1.1 |
| 6,338,883 | B1 | * | 1/2002 | Iwamatsu et al. ............ 428/1.1 |
| 6,348,961 | B2 | * | 2/2002 | Iwamatsu et al. ........... 349/175 |
| 6,366,330 | B1 | * | 4/2002 | Khan et al. .................... 349/35 |
| 6,416,826 | B1 | * | 7/2002 | Matsumoto et al. ......... 428/1.1 |

FOREIGN PATENT DOCUMENTS

EP 1130568 * 9/2001

* cited by examiner

Primary Examiner—Shean C. Wu
(74) Attorney, Agent, or Firm—Sidley Austin Brown & Wood LLP

(57) ABSTRACT

A liquid crystal display which carries out matrix driving of a chiral nematic liquid crystal composition, which is capable of displaying an image theron continuously after an electric field applied thereto is turned off, by applying an electric field to the liquid crystal composition through a plurality of scan electrodes and a plurality of data electrodes which face and cross each other with the liquid crystal composition in-between. The nematic liquid crystal which is the main element of the liquid crystal composition mainly contains a liquid crystalline ester compound, a liquid crystalline stilbene compound, a liquid crystalline terphenyl compound or a liquid crystalline tolane compound. A driving section of the liquid crystal display drives the liquid crystal composition by a driving method which comprises a reset step of applying a reset pulse to cause the liquid crystal composition to come to a homeotropic state, a selection step of applying a selection pulse to select a final state of the liquid crystal composition and an evolution step of applying an evolution pulse to cause the liquid crystal composition to evolve to the selected final state and in which the selection of the final state of the liquid crystal composition is carried out by modulating the selection pulse.

20 Claims, 13 Drawing Sheets

FIG. 5
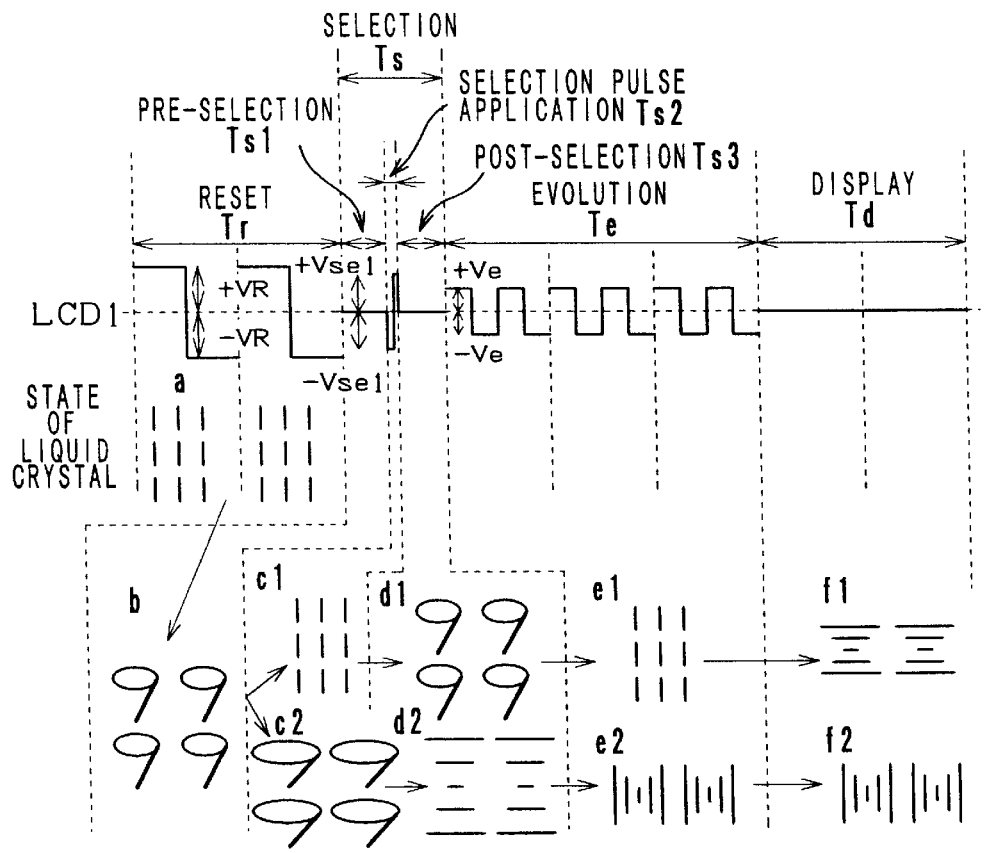
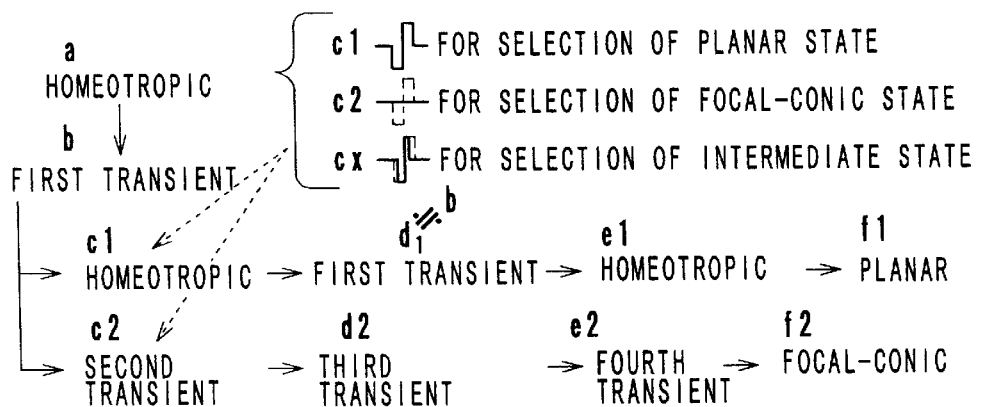

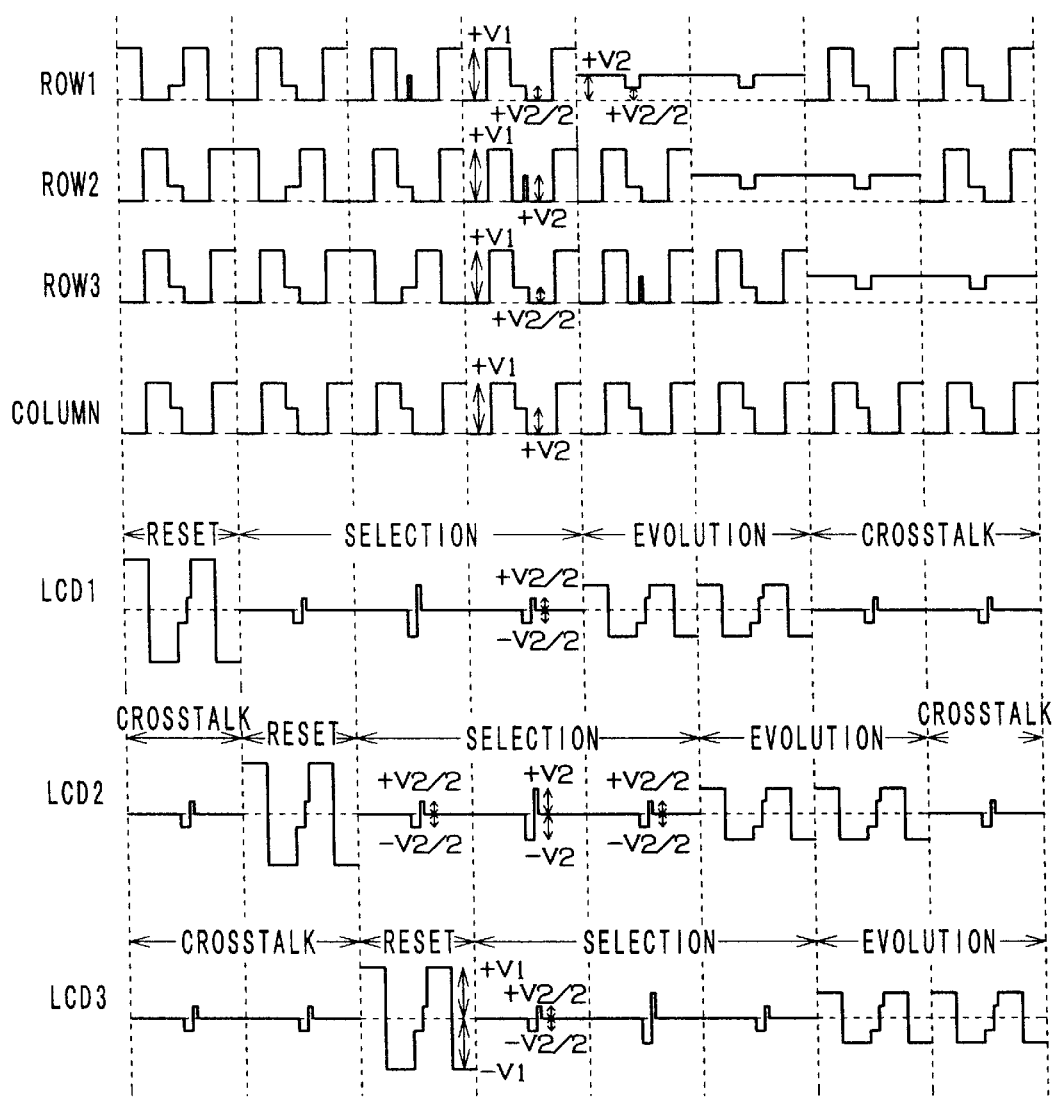
F I G. 14

LIQUID CRYSTAL DISPLAY

This application is based on Japanese patent application No. 2000-150185, the contents of which is hereby incorporated by reference.

BACKGROUND OF THE INVENTION

1. Field of the Invention

The present invention relates to a liquid crystal display, and more particularly to a liquid crystal display which carries out matrix driving of a chiral nematic liquid crystal composition, which is capable of displaying an image thereon continuously after a turn-off of the electric field thereto, through a plurality of scan electrodes and a plurality of data electrodes which face and cross each other.

2. Description of Related Art

In recent years, reflective type liquid crystal displays which use a chiral nematic liquid crystal composition which is produced by adding a chiral agent to nematic liquid crystal and which exhibits a cholesteric phase at room temperature are developed to be used as media for reproducing digital information into visual information. Such liquid crystal displays have a memory effect and accordingly consume little electric power. Also, such liquid crystal displays can be fabricated at low cost.

Although the liquid crystal displays of this kind have these advantages, they have a demerit that the driving speed is low. In order to solve this problem, there have been suggested some methods of driving such a liquid crystal display at a high speed. For example, U.S. Pat. No. 5,748,277 disclosed a method which comprises a preparation phase to cause the liquid crystal to come to a homeotropic state, a selection phase to select the liquid crystal to come to a focal-conic state or a planar state and an evolution phase to cause the liquid crystal to evolve to the desired final state.

However, liquid crystal materials which are suited to be subjected to such a driving method are yet to be studied sufficiently, and liquid crystal compositions which are satisfactory in reflectance, in contrast between a planar state and a focal-conic state, in color purity (excitation purity), etc. have not been specified yet.

SUMMARY OF THE INVENTION

An object of the present invention is to provide a reflective type liquid crystal display which is good in bistability, in color purity, in reflectance, etc., thereby resulting in display of an image with high contrast, which has a wide temperature compensation range and which can be driven at a high speed.

In order to attain the object, the inventors studied about the composition of chiral nematic liquid crystal. As a result, the inventors found out that when a chiral nematic liquid crystal composition is to be driven by a method which comprises a reset step of resetting the chiral nematic liquid crystal composition to a homeotropic state, a selection step of selecting the final state of the chiral nematic liquid crystal composition and an evolution step of causing the chiral nematic liquid crystal composition to evolve to the selected final state, the anisotropy of dielectric constant, the anisotropy of refractive index and the viscosity of the chiral nematic liquid crystal composition must be balanced with one another. Accordingly, a liquid crystal display according to the present invention uses nematic liquid crystal which contains a liquid crystalline ester compound expressed by the following formula (A) or (A'), a liquid crystalline stilbene compound expressed by the following formula (B), a liquid crystalline tarphenyl compound expressed by the following formula (C) or a liquid crystalline tolane compound expressed by the following formula (D).

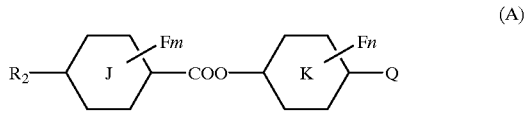
(A)

$R_2$: alkyl group, alkoxyl group, alkenyl group or fluoroalkyl group

Q: alkyl group, alkoxyl group, alkenyl group, cyano group, fluorine atom or fluoroalkyl group J, K: 1, 4-phenylene group or 1, 4-cyclohexylene group m, n: integer from 0 to 4

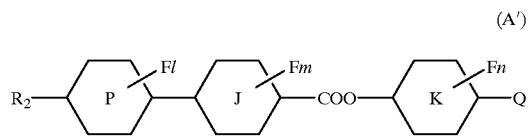
(A')

$R_2$: alkyl group, alkoxyl group, alkenyl group or fluoroalkyl group

Q: alkyl group, alkoxyl group, alkenyl group, cyano group, fluorine atom or fluoroalkyl group J, K, P: 1, 4-phenylene group or 1, 4-cyclohexylene group l, m, n: integer from 0 to 4

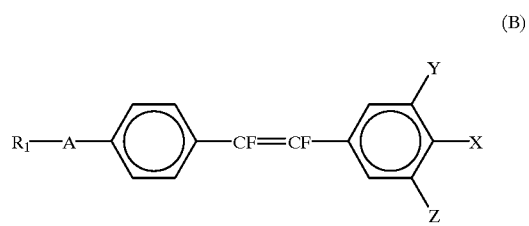
(B)

$R_1$: alkyl group with 1 to 10 carbons or alkenyl group with 2 to 10 carbons

A: single bond or 1, 4-cyclohexylene group

X: —F, —Cl or —CN

Y, Z: —F or —H

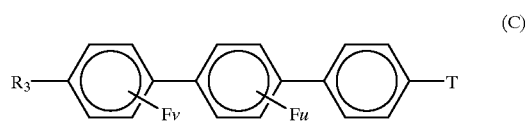
(C)

$R_3$: alkyl group, alkoxyl group or alkenyl group

T: cyano group, halogen atom, alkyl group or alkoxyl group v, u: integer from 0 to 4

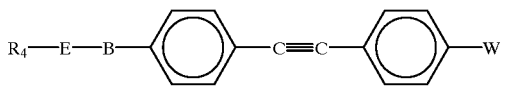

(D)

R$_4$: alkyl group or alkoxyl group
W: alkyl group, alkoxyl group, fluorine atom fluoroalkyl group or fluoroalkoxyl group
B: 1, 4-phenylene group, 1, 4-cyclohexylene group or single bond
E: 1, 4-cyclohexylene group or single bond Liquid crystalline ester compounds and liquid crystalline stilbene compounds are high in anisotropy of dielectric constant. If nematic liquid crystal contains such a compound, the liquid crystal improves in responsibility to a voltage applied thereto, and consequently, it becomes possible to lower the driving voltage. Also, this compound improves the performance in displaying black, and consequently, the contrast becomes higher. Liquid crystalline terphenyl compounds are high in anisotropy of refractive index. If nematic liquid crystal contains such a compound, the liquid crystal consequently includes lots of scattering elements, and the contrast becomes higher. Also, because of this compound, the operating temperature range of the liquid crystal becomes wider. Further, because of this compound, the liquid crystal is capable of maintaining reliability and stability for a long time. Liquid crystalline tolane compounds are high in birefringence. If nematic liquid crystal contains such a compound, the viscosity of the liquid crystal is lowered while the high birefringence is maintained. Further, by containing a liquid crystalline compound other than these kinds in nematic liquid crystal, which has a polar group at an end, the driving voltage can be lowered more.

Thus, these compounds permit liquid crystal to obtain good characteristics, such as high responsibility to the voltage applied, high contrast and low viscosity while keeping high birefringence. Therefore, when the liquid crystal is driven at a high speed by the driving method which comprises the reset step, the selection step and the evolution step, the liquid crystal achieves good display performance.

Therefore, the liquid crystal display according to the present invention comprises a driving section for driving such a liquid crystal composition by a driving method which comprises a reset step of applying a reset pulse to cause the liquid crystal composition to a homeotropic state, a selection step of applying a selection pulse to select the final state of the liquid crystal composition and an evolution step of applying an evolution pulse to cause the liquid crystal composition to evolve to the selected final state and in which the selection of the final state of the liquid crystal composition is carried out by modulating the selection pulse.

Because the liquid crystal composition is driven step by step in the reset step, in the selection step and in the evolution step, a desired image can be written on the liquid crystal composition at a relatively high speed. Moreover, by modulating the selection pulse, display of intermediate tones becomes possible.

The liquid crystal composition may further contain a coloring agent or a ultraviolet-ray absorber. The coloring agent adjusts the color purity of the liquid crystal composition. The ultraviolet-ray absorber prevents the liquid crystal composition from degrading because of being exposed to ultraviolet rays.

The driving method executed by the driving section may comprise, in the selection step, before and after the application of the selection pulse, a time of applying substantially zero volt to the liquid crystal composition. In this case, because there is a time of applying substantially zero volt in the selection step, the number of output levels of the driver can be reduced.

BRIEF DESCRIPTION OF THE DRAWINGS

This and other objects and features of the present invention will be apparent from the following description with reference to the accompanying drawings, in which:

FIG. 5 is an illustration which shows the principle of a method of driving the liquid crystal display;

FIG. 14 is a chart which shows driving waveforms in a fourth driving example.

DETAILED DESCRIPTION OF THE PREFERRED EMBODIMENTS

Embodiments of a liquid crystal display according to the present invention are described with reference to the accompanying drawings.

Liquid Crystal Display; See FIGS. 1–4

First, a liquid crystal display which comprises a chiral nematic liquid crystal composition is described. The chiral nematic liquid crystal composition is prepared by adding a chiral agent to nematic liquid crystal and exhibits a cholesteric phase.

Figure 1:
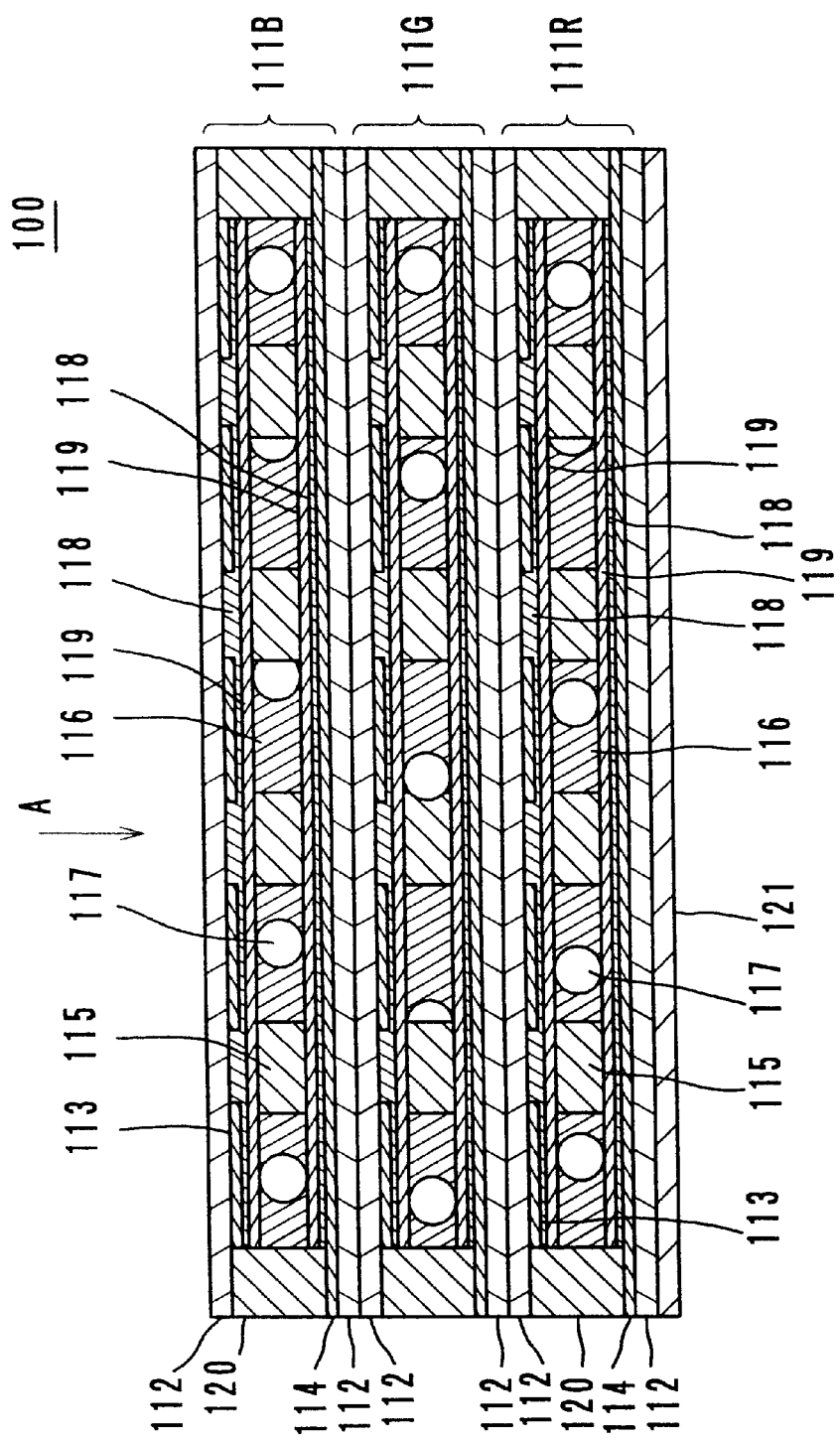
FIG. 1 is a sectional view of an exemplary liquid crystal display according to the present invention.

FIG. 1 shows a reflective type full-color liquid crystal display which is driven by a simple matrix driving method. In this liquid crystal display 100, on a light absorbing layer 121, a red display layer 111R, a green display layer 111G and a blue display layer 111B are laminated. The red display layer 111R makes a display by switching between a red selective reflection state and a transparent state. The green display layer 111G makes a display by switching between a green selective reflection state and a transparent state. The blue display layer 111B makes a display by switching between a blue selective reflection state and a transparent state.

Each of the display layers 111R, 111G and 111B has, between transparent substrates 112 on which transparent electrodes 113 and 114 are formed, resin columnar nodules 115, liquid crystal 116 and spacers 117. On the transparent electrodes 113 and 114, an insulating layer 118 and an alignment controlling layer 119 are provided if necessary. Around the substrates 112 (out of a displaying area), a sealant 120 is provided to seal the liquid crystal 116 therein.

The transparent electrodes 113 and 114 are connected to driving ICs 131 and 132 respectively (see FIG. 4), and specified pulse voltages are applied between the transparent electrodes 113 and 114. In response to the voltages applied, the liquid crystal 116 switches between a transparent state to transmit visible light and a selective reflection state to selectively reflect light of a specified wavelength.

In each of the display layers 111R, 111G and 111B, the transparent electrodes 113 and 114, respectively, are composed of a plurality of strip-like electrodes which are arranged in parallel at fine intervals. The extending direction of the strip-like electrodes 113 and the extending direction of the strip-like electrodes 114 are perpendicular to each other, and the electrodes 113 and the electrodes 114 face each other. Electric power is applied between these upper electrodes and lower electrodes serially, that is, voltages are applied to the liquid crystal 116 serially in a matrix, so that the liquid crystal 116 makes a display. This is referred to as matrix driving. The intersections between the electrodes 113 and 114 function as pixels. By carrying out this matrix driving toward the display layers 111R, 111G and 111B respectively, a full-color image is displayed on the liquid crystal display 100.

A liquid crystal display which has liquid crystal which exhibits a cholesteric phase between two substrates makes a display by switching the liquid crystal between a planar state and a focal-conic state. When the liquid crystal is in the planar state, the liquid crystal selectively reflects light of a wavelength $\lambda=Pn$ (P: helical pitch of the cholesteric liquid crystal, n: average refractive index). When the liquid crystal display is in the focal-conic state, if the wavelength of light selectively reflected by the liquid crystal is in the infrared spectrum, the liquid crystal scatters light, and if the wavelength of light selectively reflected by the liquid crystal is shorter than the infrared spectrum, the liquid crystal transmits visible light. Accordingly, if the wavelength of light selectively reflected by the liquid crystal is set within the visible spectrum and if a light absorbing layer is provided in the side opposite the observing side of the display, the liquid crystal display makes displays as follows: when the liquid crystal is in the planar state, the liquid crystal display makes a display of the color determined by the selectively reflected light; and when the liquid crystal is in the focal-conic state, the liquid crystal display makes a display of black. Also, if the wavelength of light selectively reflected by the liquid crystal is set within the infrared spectrum and if a light absorbing layer is provided in the side opposite the observing side of the display, the liquid crystal display makes displays as follows: when the liquid crystal is in the planar state, the liquid crystal reflects infrared, light but transmits visible light, and accordingly, the liquid crystal display makes a display of black; and when the liquid crystal display is in the focal-conic state, the liquid crystal scatters light, and accordingly, the liquid crystal display makes a display of white.

In the liquid crystal display 100 in which the display layers 111R, 111G and 111B are laminated, when the liquid crystal of the blue display layer 111B and the liquid crystal of the green display layer 111G are in the focal-conic state (transparent state) and when the liquid crystal of the red display layer 111R is in the planar state (selective reflection state), a display of red is made. When the liquid crystal display of the blue display layer 111B is in the focal-conic state (transparent state) and when the liquid crystal of the green display layer 111G and the liquid crystal of the red display layer 111R are in the planar state (selective reflection state), a display of yellow is made. Thus, by setting the display layers 111R, 111G and 111B in the transparent state or in the selective reflection state appropriately, displays of red, green, blue, white, cyan, magenta, yellow and black are possible. Further, by setting the display layers 111R, 111G and 111B in intermediate states, displays of intermediate colors are possible, and thus, the liquid crystal display 21 can be used as a full-color display.

As the transparent substrates 112, transparent glass plates and transparent resin films are usable.

As the transparent electrodes 113 and 114, transparent electrodes of ITO (indium tin oxide), metal electrodes such as aluminum, silicon, etc., and electrodes of photoconductive films such as amorphous silicon, BSO (bismuth silicon oxide), etc. are usable. The transparent electrodes 114 on the lowermost layer may be black electrodes so as to also function as a light absorber.

As the insulating layers 118, inorganic films such as silicon oxide, etc. and organic films such as polyimide resin, epoxy resin, etc. are usable so as to also function as a gas barrier layer. The insulating layers 118 prevent short-circuits among the substrates 112 and improve the reliability of the liquid crystal. As the alignment controlling layers 119, typically polyimide is used.

The liquid crystal 116 preferably exhibits a cholesteric phase at room temperature. Especially a chiral nematic liquid crystal composition which is produced by adding a chiral agent to nematic liquid crystal is suited.

Specifically, the nematic liquid crystal which is used in this embodiment contains a liquid crystalline ester compound expressed by the following generic formula (A) or (A'), a liquid crystalline stilbene compound expressed by the following generic formula (B), a liquid crystalline tarphenyl compound expressed by the following generic formula (C) or a liquid crystalline tolane compound expressed by the following generic formula (D).

Liquid crystalline ester compounds and liquid crystalline stilbene compounds are high in anisotropy of dielectric constant, low in viscosity and high in anisotropy of refractive index. Accordingly, such a compound is contained in nematic liquid crystal lowers the driving voltage of the liquid crystal and improves the responsibility of the liquid crystal. The compound in the nematic liquid crystal further has a function of heightening the contrast between a colored state and a transparent state. Liquid crystalline tarphenyl compounds include lots of scattering elements and contribute to light stability. Liquid crystalline tarphenyl compounds also widen the operating temperature range. Liquid crystalline tolane compounds, when such a compound is contained in nematic liquid crystal, make the viscosity of the nematic liquid crystal while keeping large birefringence.

Such a liquid crystalline compound is contained in the nematic liquid crystal preferably as the main element of the nematic liquid crystal, for example, at not less than 30 wt %. A plurality of these liquid crystalline compounds may be contained. In this case, the liquid crystalline compounds may be expressed by the same generic formula or may be expressed by different generic formulas.

The liquid crystal composition may contain other liquid crystalline compounds. Any liquid crystalline compounds can be contained as long as they are stable as nematic liquid crystal; for example, liquid crystalline polycyclic compounds and non-polar liquid crystalline compounds are usable. Further, a coloring agent and a ultraviolet-ray absorber may be contained in the liquid crystal composition.

Here, the generic formulas (A) and (A') of usable liquid crystalline ester compounds are shown. Although specific formulas (A1) through (A73) and (A'1) through (A'40) are also shown, usable ester compounds are not limited to these specific formulas.

(A)
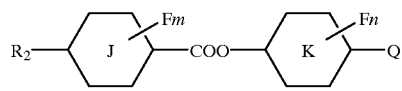

$R_2$: alkyl group, alkoxyl group, alkenyl group or fluoroalkyl group

Q: alkyl group, alkoxyl group, alkenyl group, cyano group, fluorine atom or fluoroalkyl group J, K: 1, 4-phenylene group or 1, 4-cyclohexyle group m, n: integer from 0 to 4

(A')
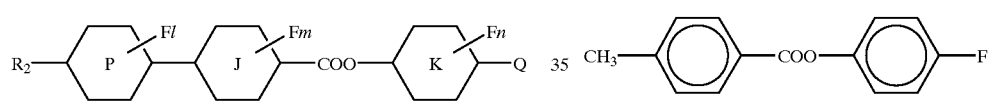

$R_2$: alkyl group, alkoxyl group, alkenyl group or fluoroalkyl group

Q: alkyl group, alkoxyl group, alkenyl group, cyano group, fluorine atom or fluoroalkyl group J, K, P: 1, 4-phenylene group or 1, 4-cyclohexyle group l, m, n: integer from 0 to 4

(A1)
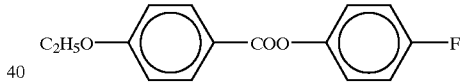

(A2)
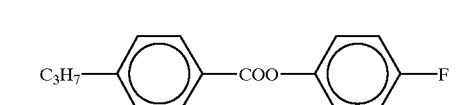

(A3)

(A4)
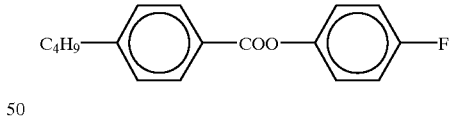

(A5)

(A6)
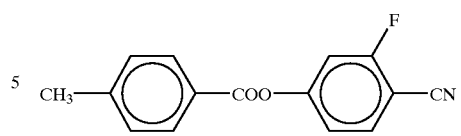

(A7)
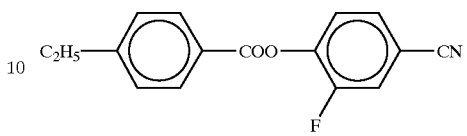

(A8)
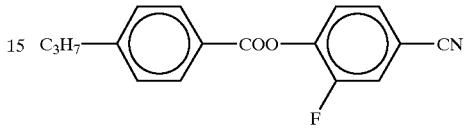

(A9)
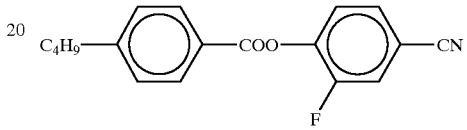

(A10)
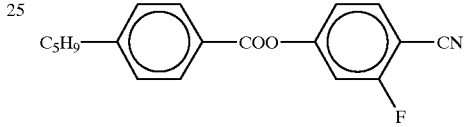

(A11)
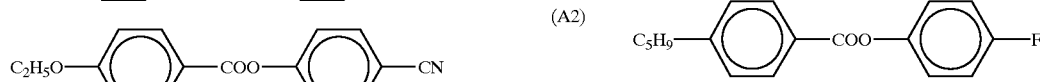

(A12)
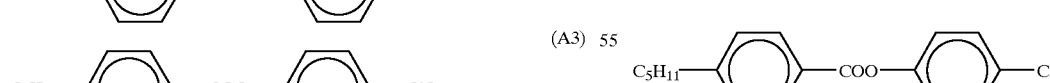

(A13)
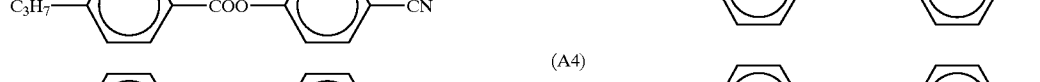

(A14)

(A15)
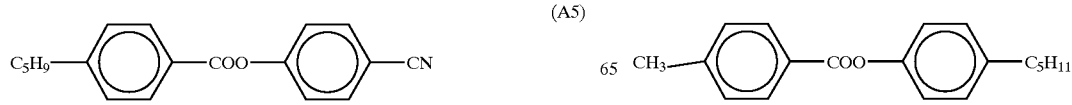

(A16)

(A17)

(A18)

(A19) 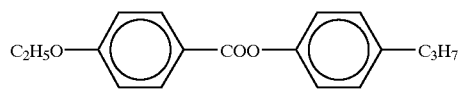
(A20) 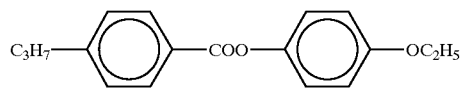
(A21) 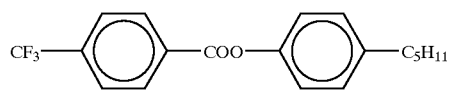
(A22) 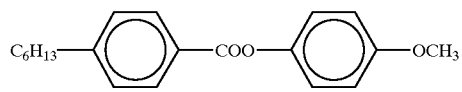
(A23) 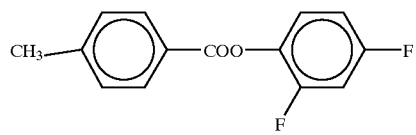
(A24) 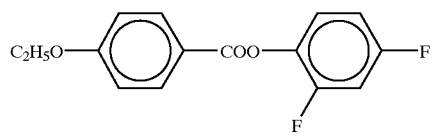
(A25) 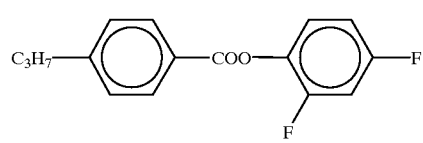
(A26) 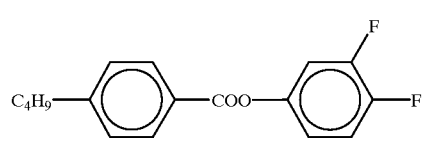
(A27) 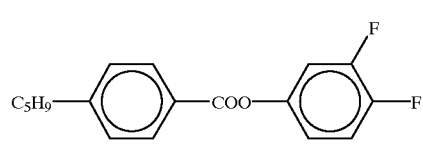
(A28) 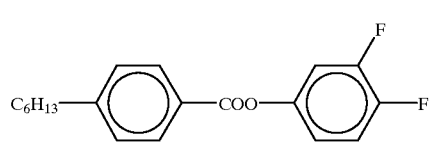
(A29) 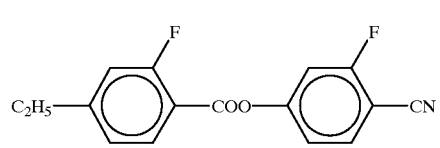
(A30) 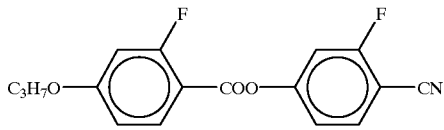
(A31) 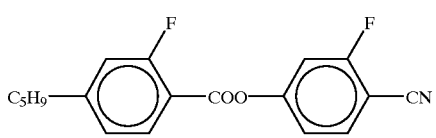
(A32) 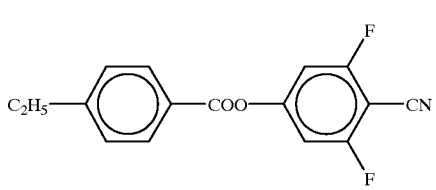
(A33) 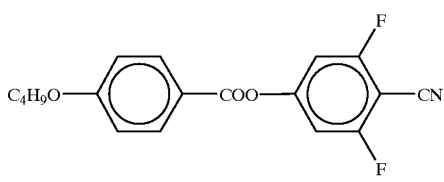
(A34) 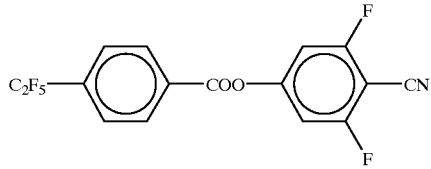
(A35) 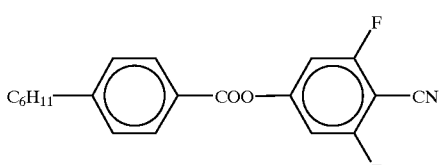
(A36) 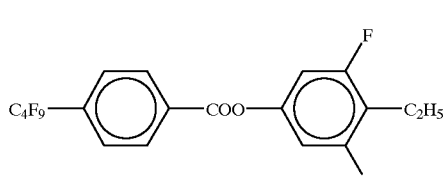
(A37) 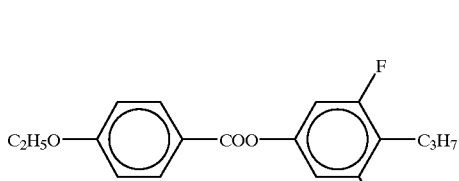

(A38) 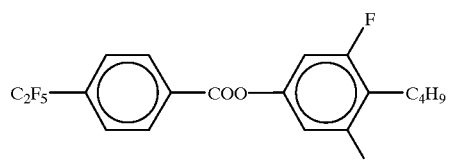
(A39) 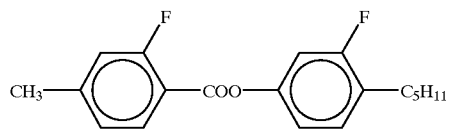
(A40) 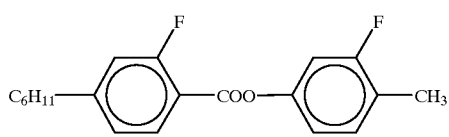
(A41) 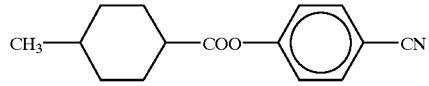
(A42) 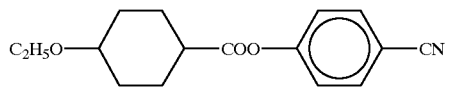
(A43) 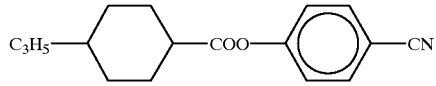
(A44) 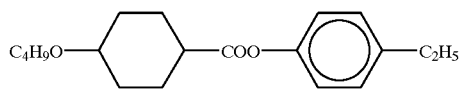
(A45) 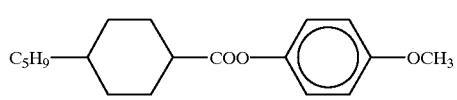
(A46) 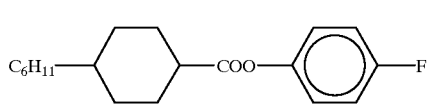
(A47) 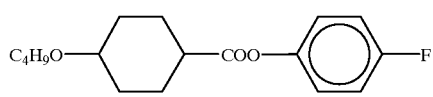
(A48) 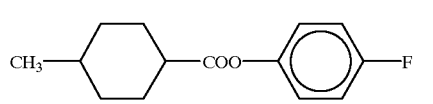
(A49) 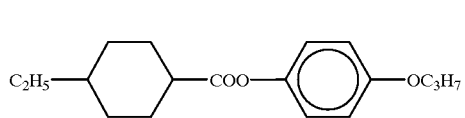
(A50) 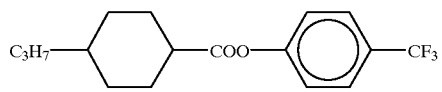
(A51) 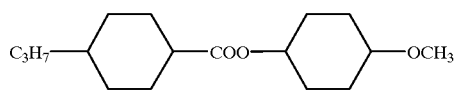
(A52) 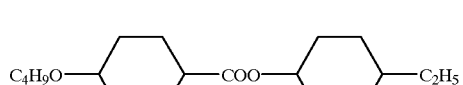
(A53) 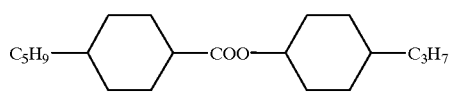
(A54) 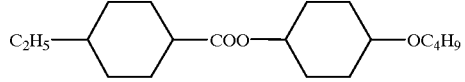
(A55) 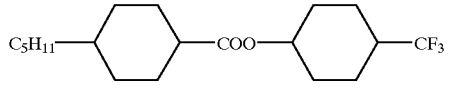
(A56) 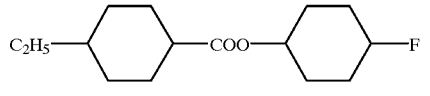
(A57) 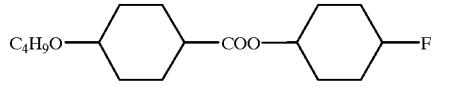
(A58) 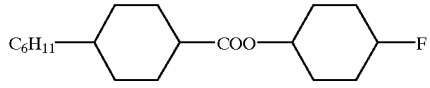
(A59) 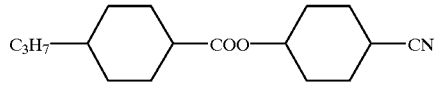
(A60) 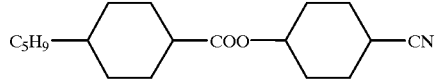
(A61) 
(A62)

-continued
(A63)
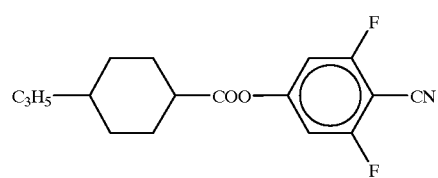
(A64)
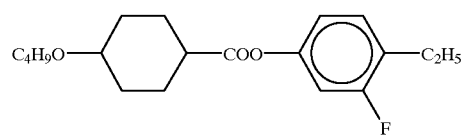
(A65)
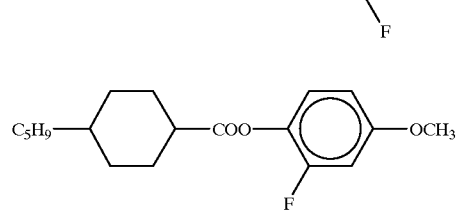
(A66)
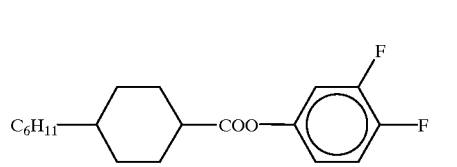
(A67)
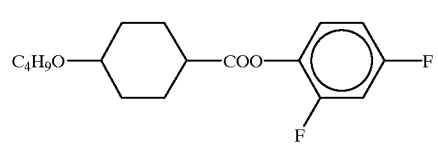
(A68)
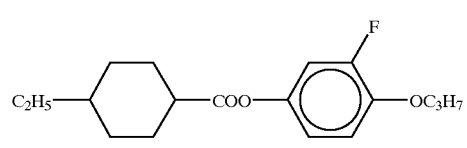
(A69)
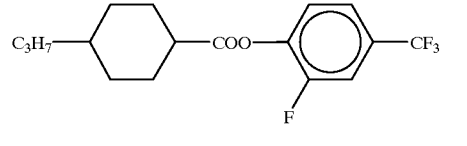
(A70)
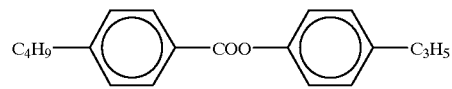
(A71)
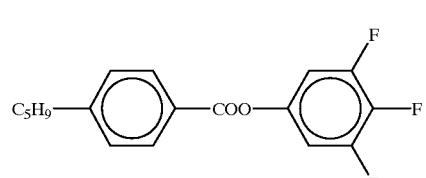
-continued
(A72)
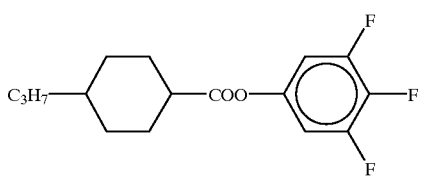
(A73)
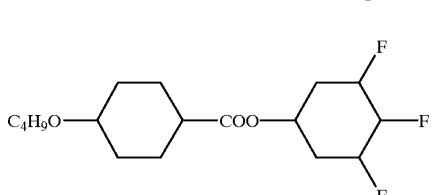
(A'1)
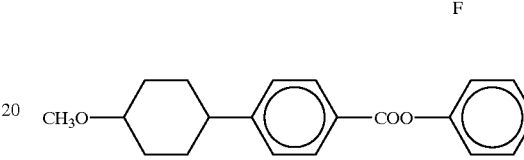
(A'2)
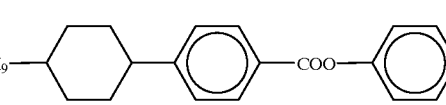
(A'3)
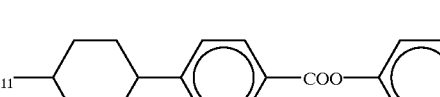
(A'4)
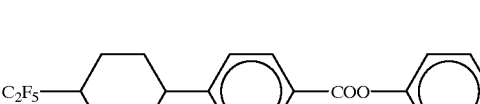
(A'5)
(A'6)
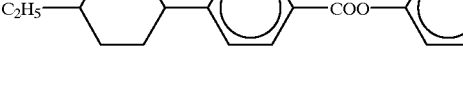
(A'7)
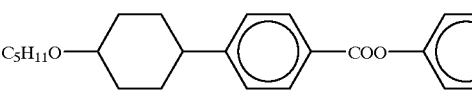
(A'8)
(A'9)

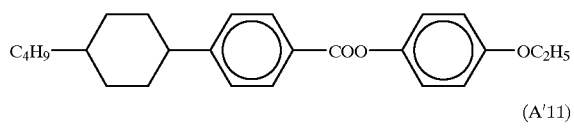
(A'10)
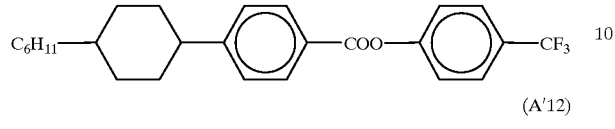
(A'11)
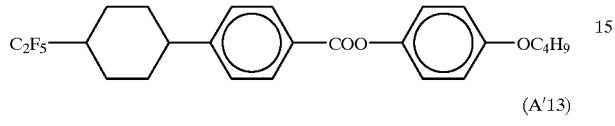
(A'12)
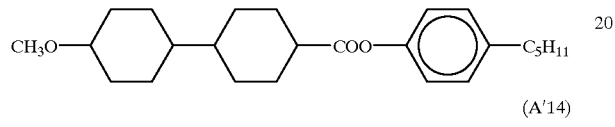
(A'13)
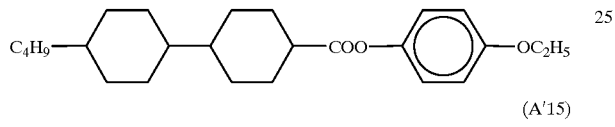
(A'14)
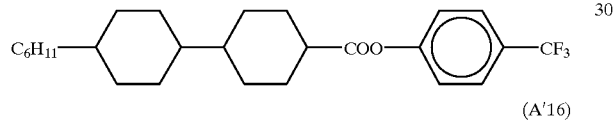
(A'15)
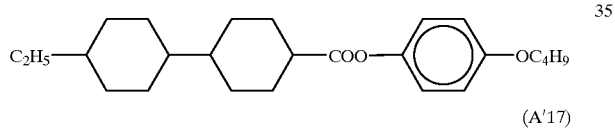
(A'16)
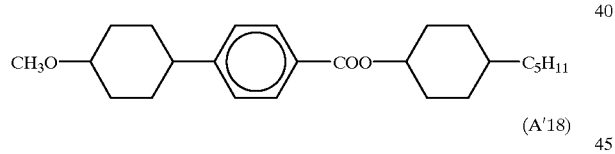
(A'17)
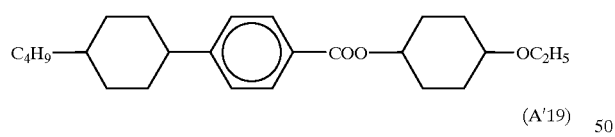
(A'18)
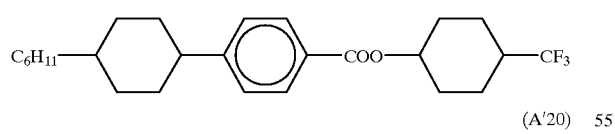
(A'19)
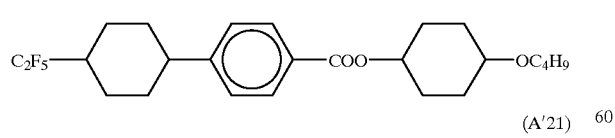
(A'20)
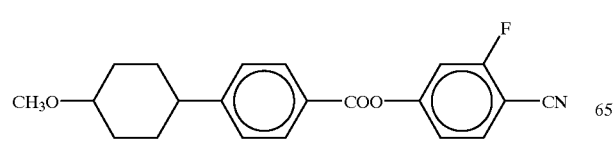
(A'21)
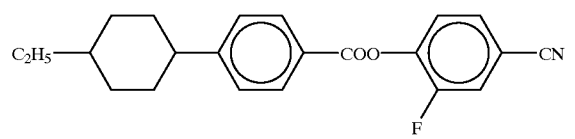
(A'22)
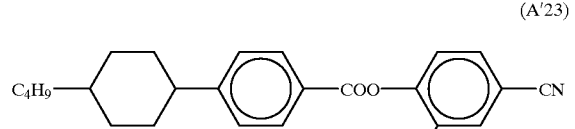
(A'23)
(A'24)
(A'25)
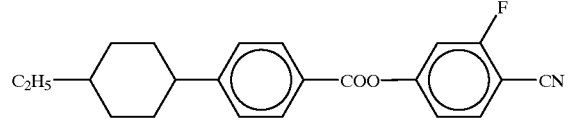
(A'26)
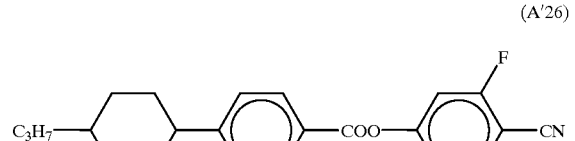
(A'27)
(A'28)
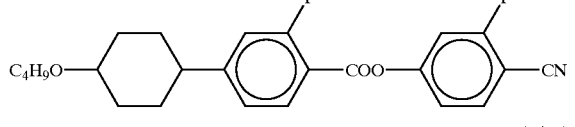
(A'29)
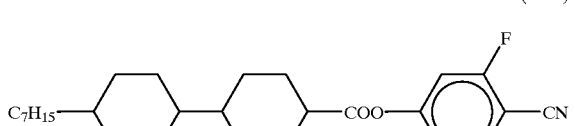
(A'30)
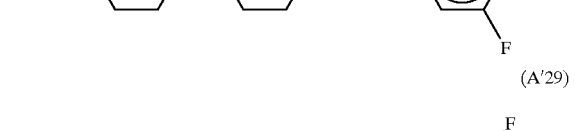
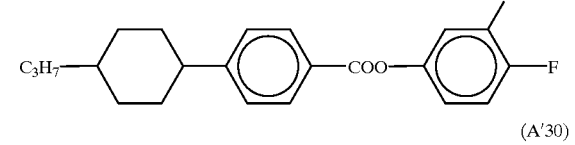
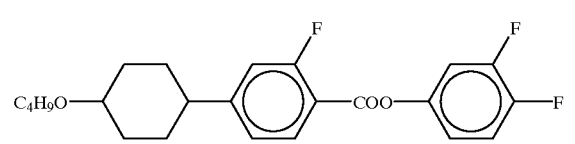

(A'31)
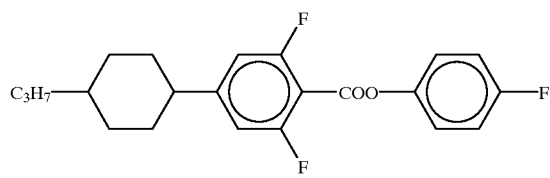

(A'32)
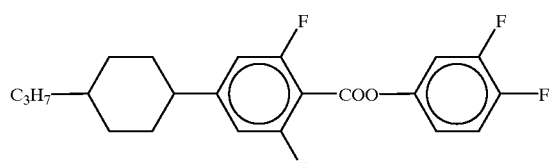

(A'33)
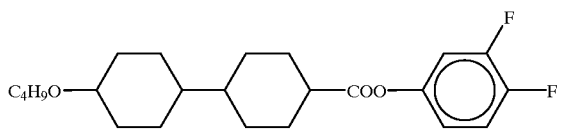

(A'34)
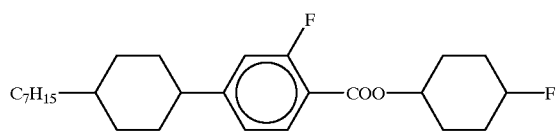

(A'35)
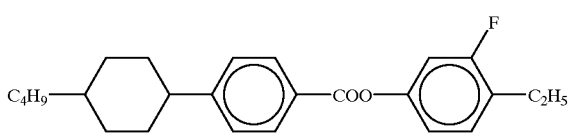

(A'36)
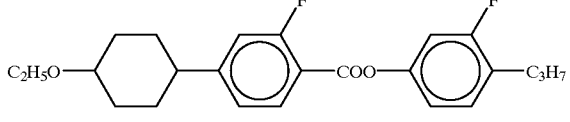

(A'37)
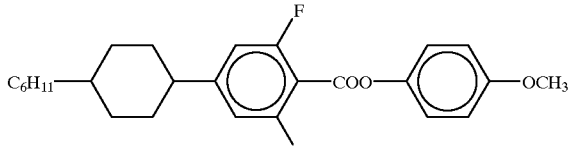

(A'38)
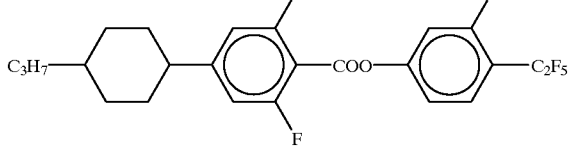

(A'39)
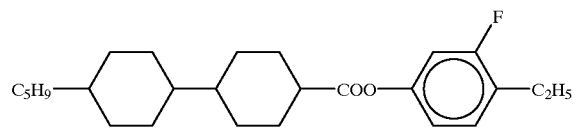

(A'40)
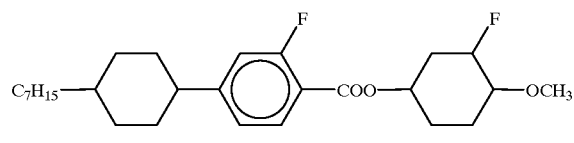

Next, the generic formula (B) of usable liquid crystalline stilbene compounds is shown. Although specific formulas (B1) through (B64) are also shown, usable liquid crystalline stilbene compounds are not limited to these specific formulas.

(B)
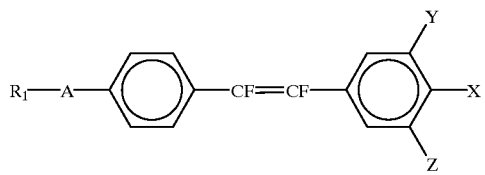

$R_1$: alkyl group with 1 to 10 carbons or alkenyl group with 2 to 10 carbons

A: single bond or 1, 4-cyclohexylene group

X: —F, —Cl or —CN

Y, Z: —F or —H (B1)
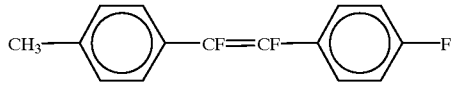

(B2)
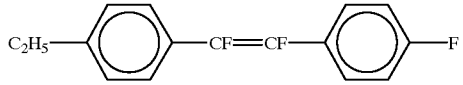

(B3)
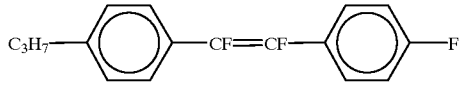

(B4)
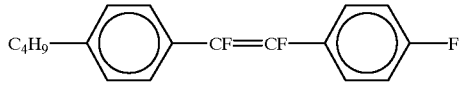

(B5)
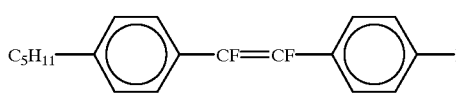

(B6)
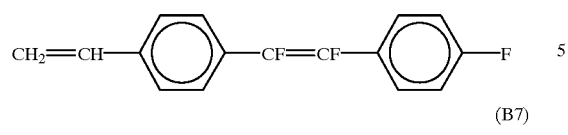
(B7)
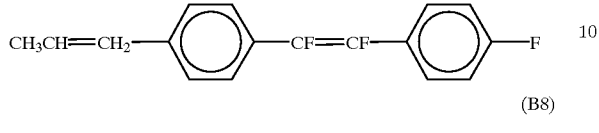
(B8)
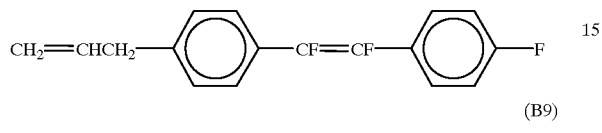
(B9)
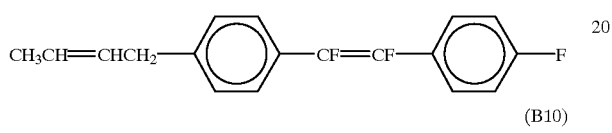
(B10)
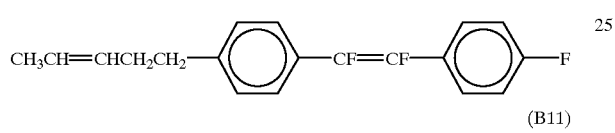
(B11)
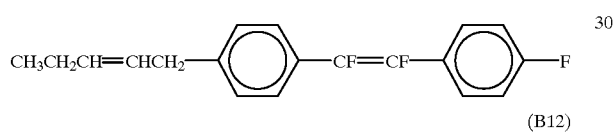
(B12)
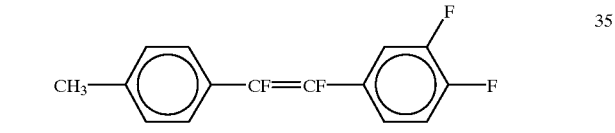
(B13)
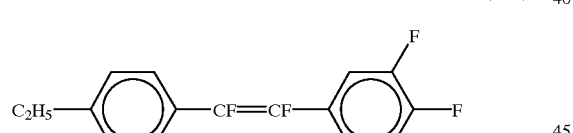
(B14)
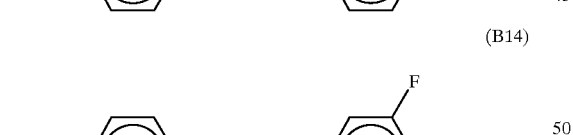
(B15)
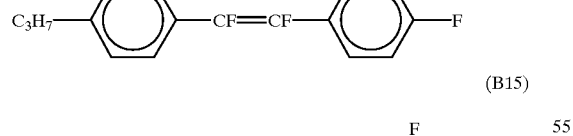
(B16)
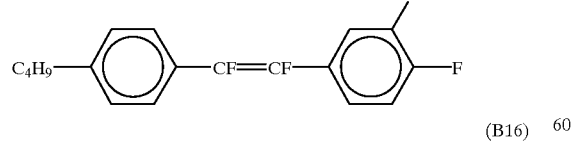
(B17)
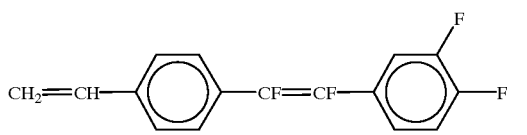
(B18)
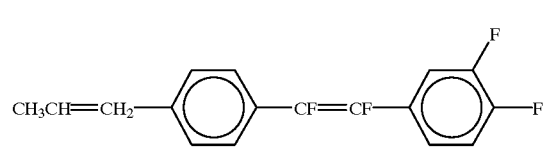
(B19)
(B20)
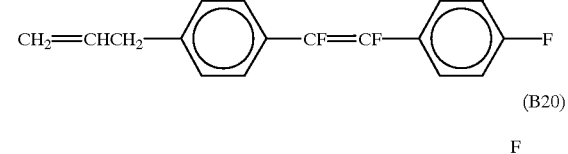
(B21)
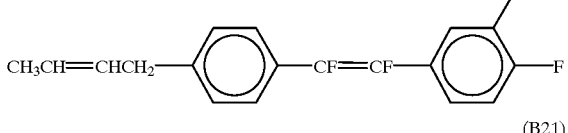
(B22)
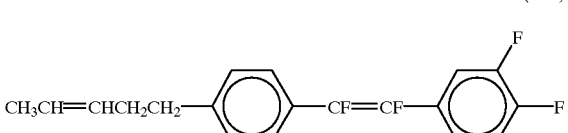
(B23)
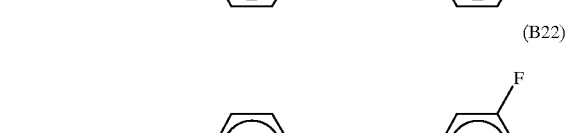
(B24)
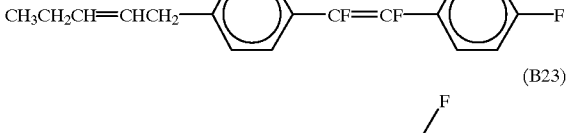
(B25)

(B26) 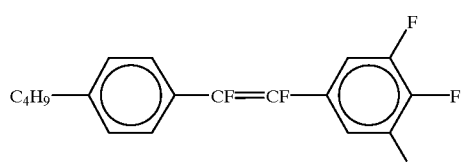
(B27) 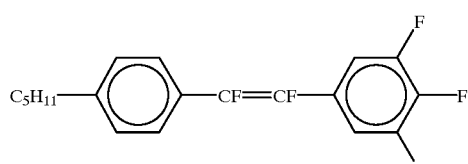
(B28) 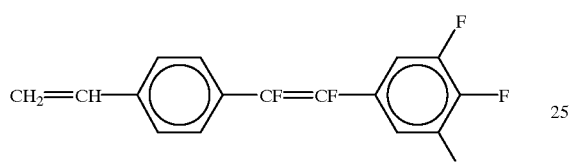
(B29) 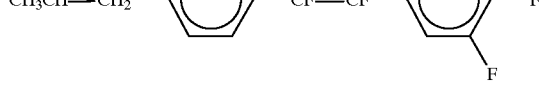
(B30) 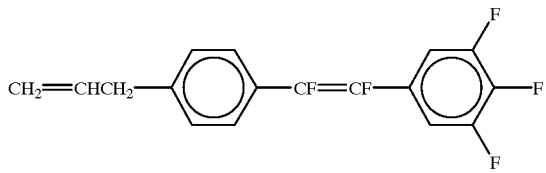
(B31) 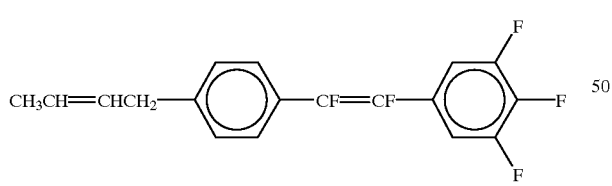
(B32) 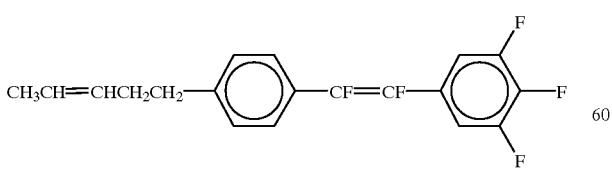
(B33) 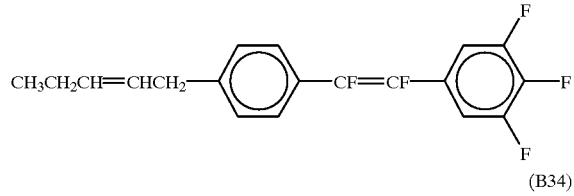
(B34) 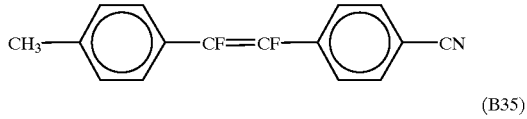
(B35) 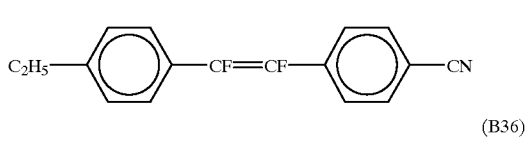
(B36) 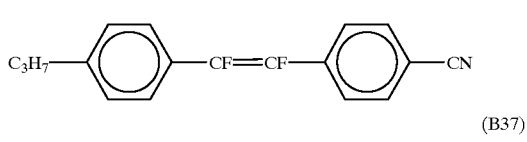
(B37) 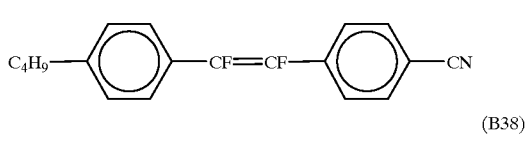
(B38) 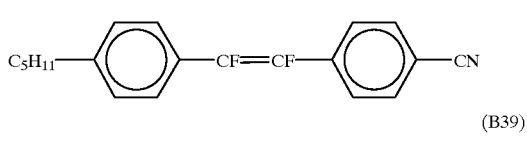
(B39) 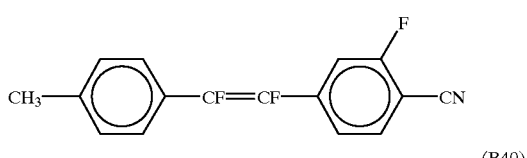
(B40) 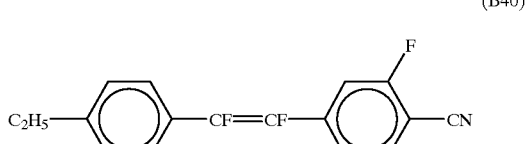
(B41) 
(B42) 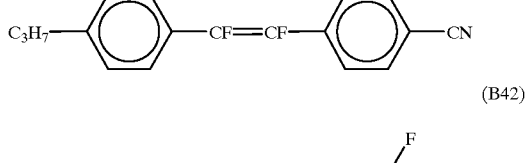

(B43) 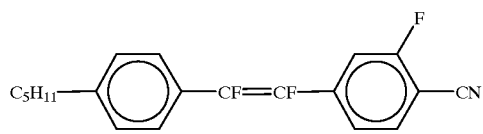

(B44) 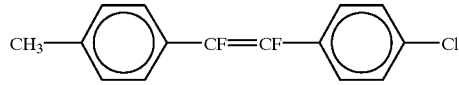

(B45) 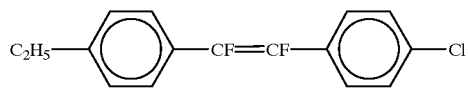

(B46) 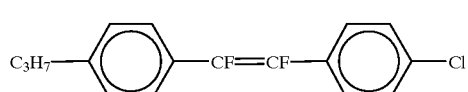

(B47) 

(B48) 

(B49) 

(B50) 

(B51) 

(B52) 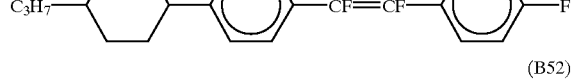

(B53) 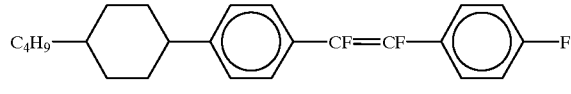

(B54) 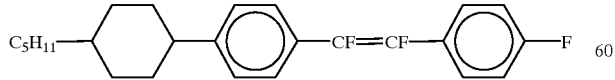

(B55) 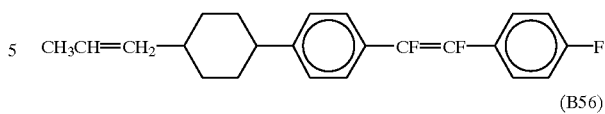

(B56) 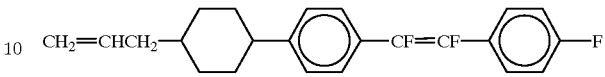

(B57) 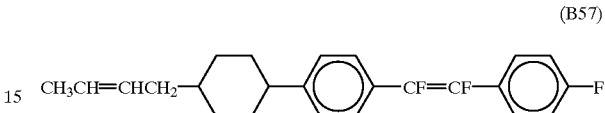

(B58) 

(B59) 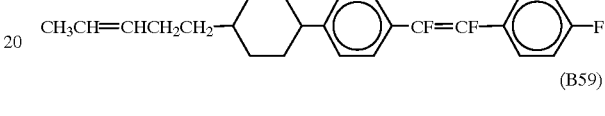

(B60) 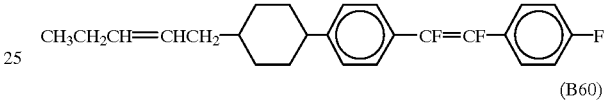

(B61) 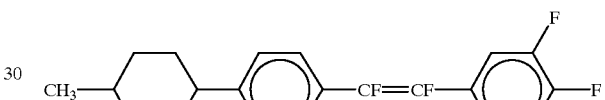

(B62) 

(B63) 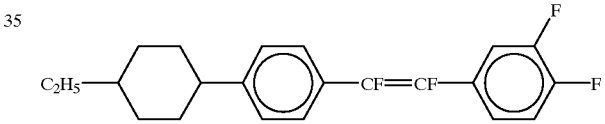

(B64) 

Next, the generic formula (C) of usable crystalline tarphenyl compounds is shown. Although specific formulas (C1) through (C49) are also shown, usable liquid crystalline tarphenyl compounds are not limited to these specific formulas. In the compounds expressed by the following specific formulas, the ones which contain a polar group, such as a halogen atom, a cyano group, etc., are especially desirable.

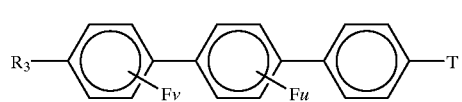
(C)
R₃: alkyl group, alkoxyl group or alkenyl group
T: cyano group, halogen atom, alkyl group or alkoxyl group
v, u: integer from 0 to 4
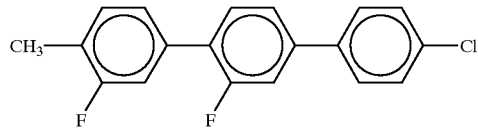
(C1)
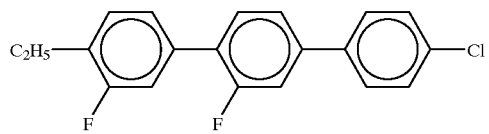
(C2)
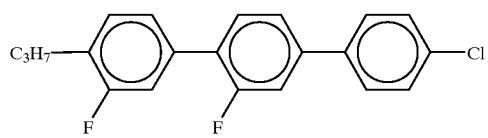
(C3)
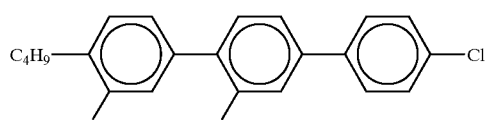
(C4)
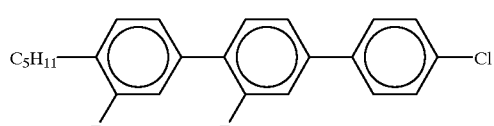
(C5)
(C6)
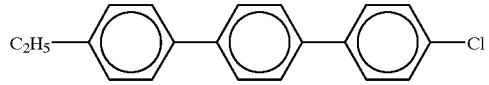
(C7)
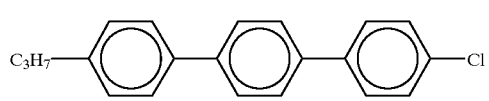
(C8)
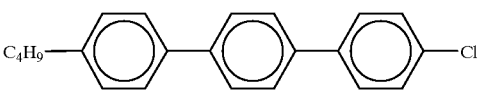
(C9)
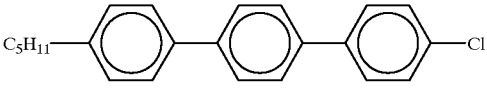
(C10)
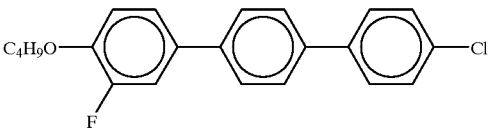
(C11)
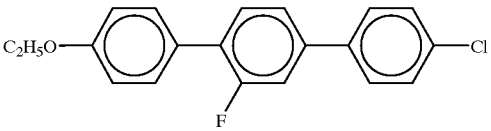
(C12)
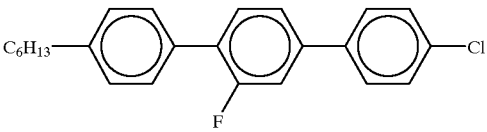
(C13)
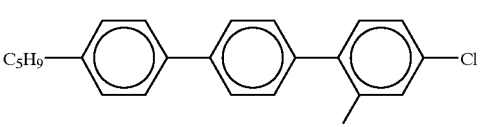
(C14)
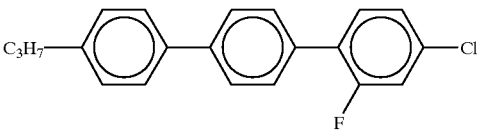
(C15)
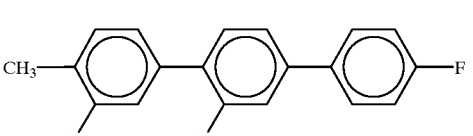
(C16)
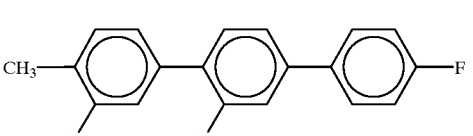
(C17)

-continued
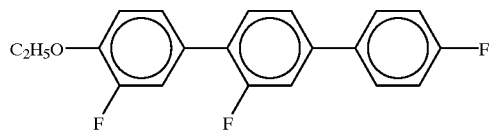
(C18)
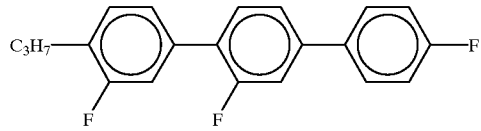
(C19)
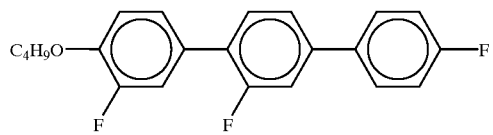
(C20)
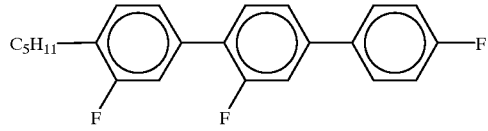
(C21)
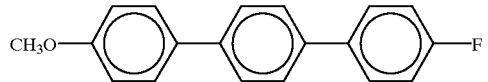
(C22)
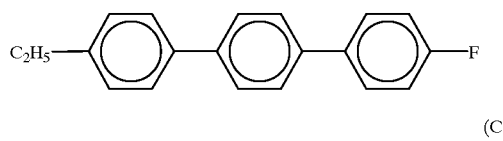
(C23)
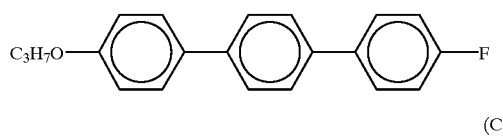
(C24)
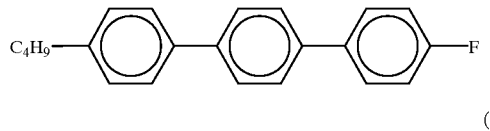
(C25)
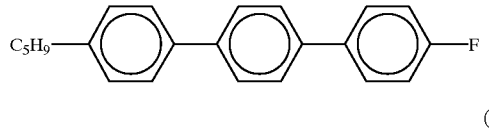
(C26)
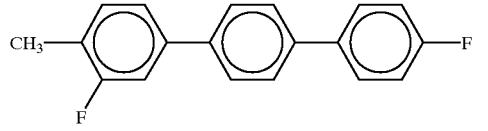
(C27)
-continued
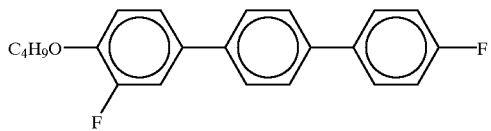
(C28)
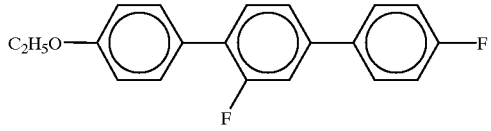
(C29)
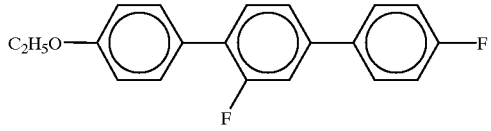
(C30)
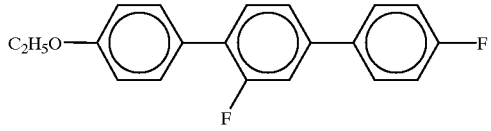
(C31)
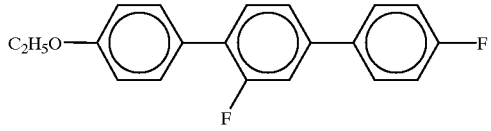
(C32)
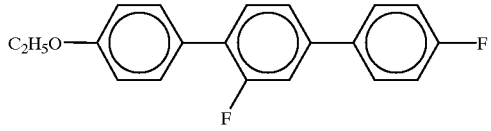
(C33)
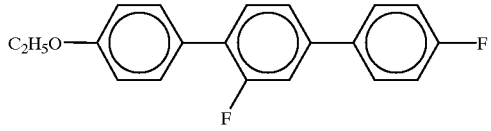
(C34)
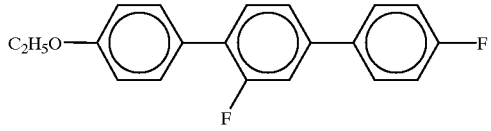
(C35)
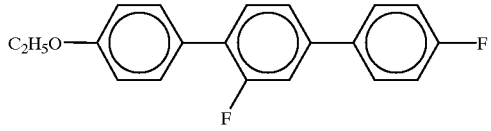
(C36)

(C37) 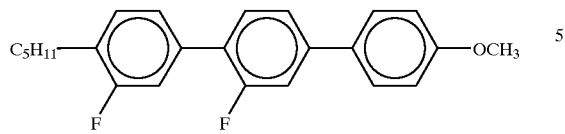

(C38) 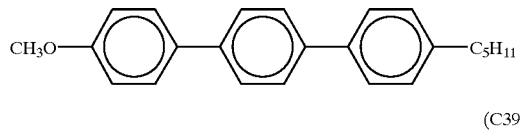

(C39) 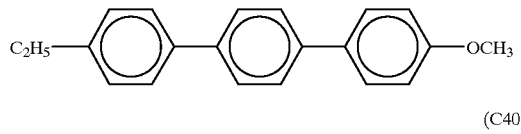

(C40) 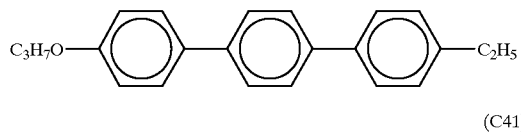

(C41) 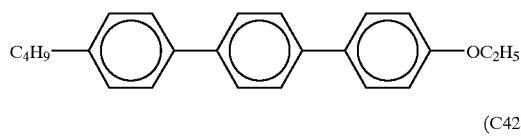

(C42) 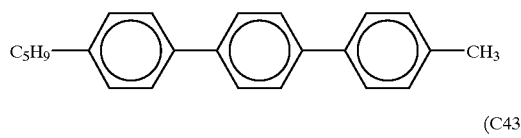

(C43) 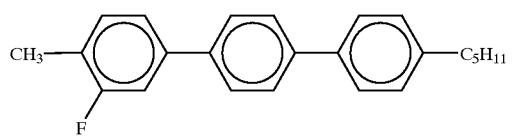

(C44) 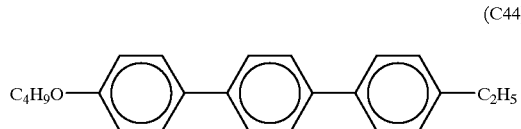

(C45) 

(C46) 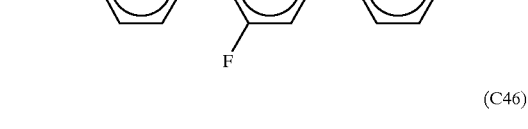

(C47) 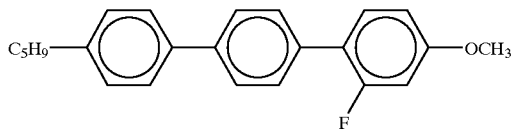

(C48) 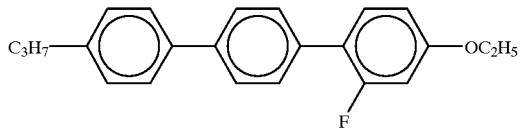

(C49) 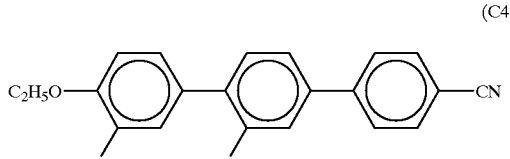

Next, the generic formula (D) of usable liquid crystalline tolane compounds is shown. Although specific formulas (D1) through (D76) are also shown, usable liquid crystalline tolane compounds are not limited to these specific formulas.

(D) 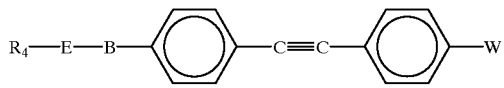

$R_4$: alkyl group or alkoxyl group

W: alkyl group, alkoxyl group, fluorine atom, fluoroalkyl group or fluoroalkoxyl group B: 1, 4-phenylene group, 1, 4-cyclohexylene group or single bond E: 1, 4-cyclohexylene group or single bond (D1) 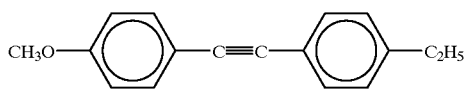

(D2) 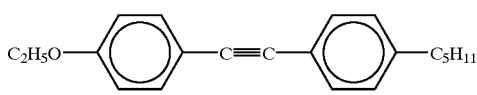

(D3) 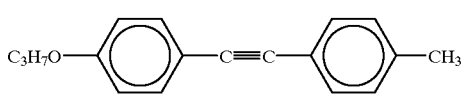

(D4) 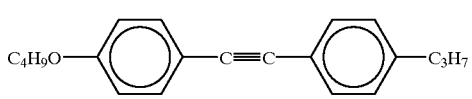

-continued
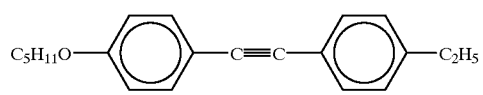
(D5)
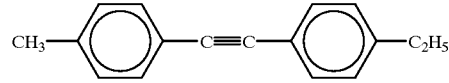
(D6)
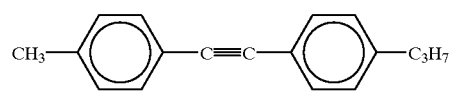
(D7)
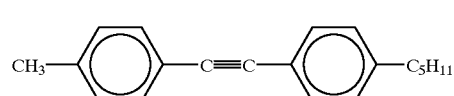
(D8)
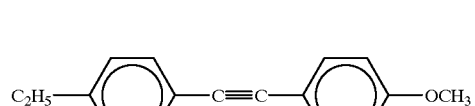
(D9)
(D10)
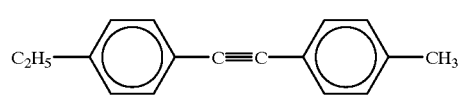
(D11)
(D12)
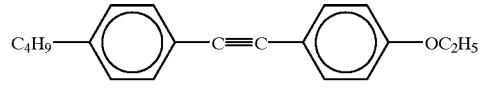
(D13)
(D14)
(D15)
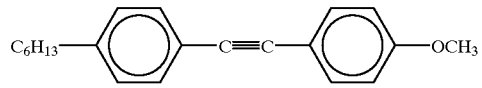
(D16)
(D17)
-continued
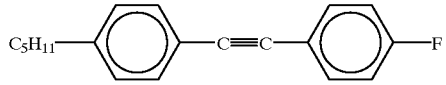
(D18)
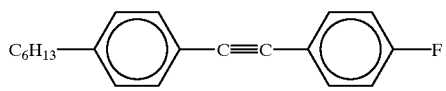
(D19)
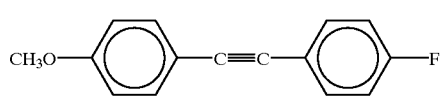
(D20)
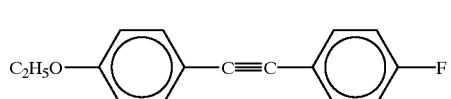
(D21)
(D22)
(D23)
(D24)
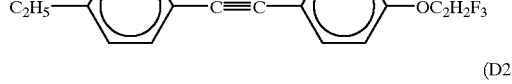
(D25)
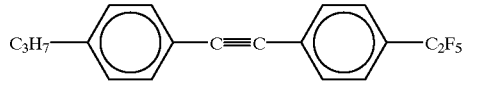
(D26)
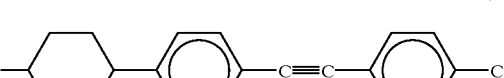
(D27)
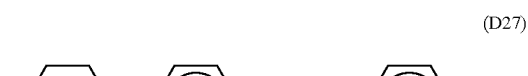
(D28)
(D29)
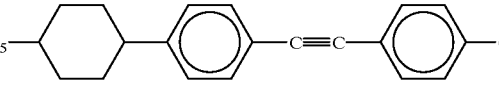
(D30)

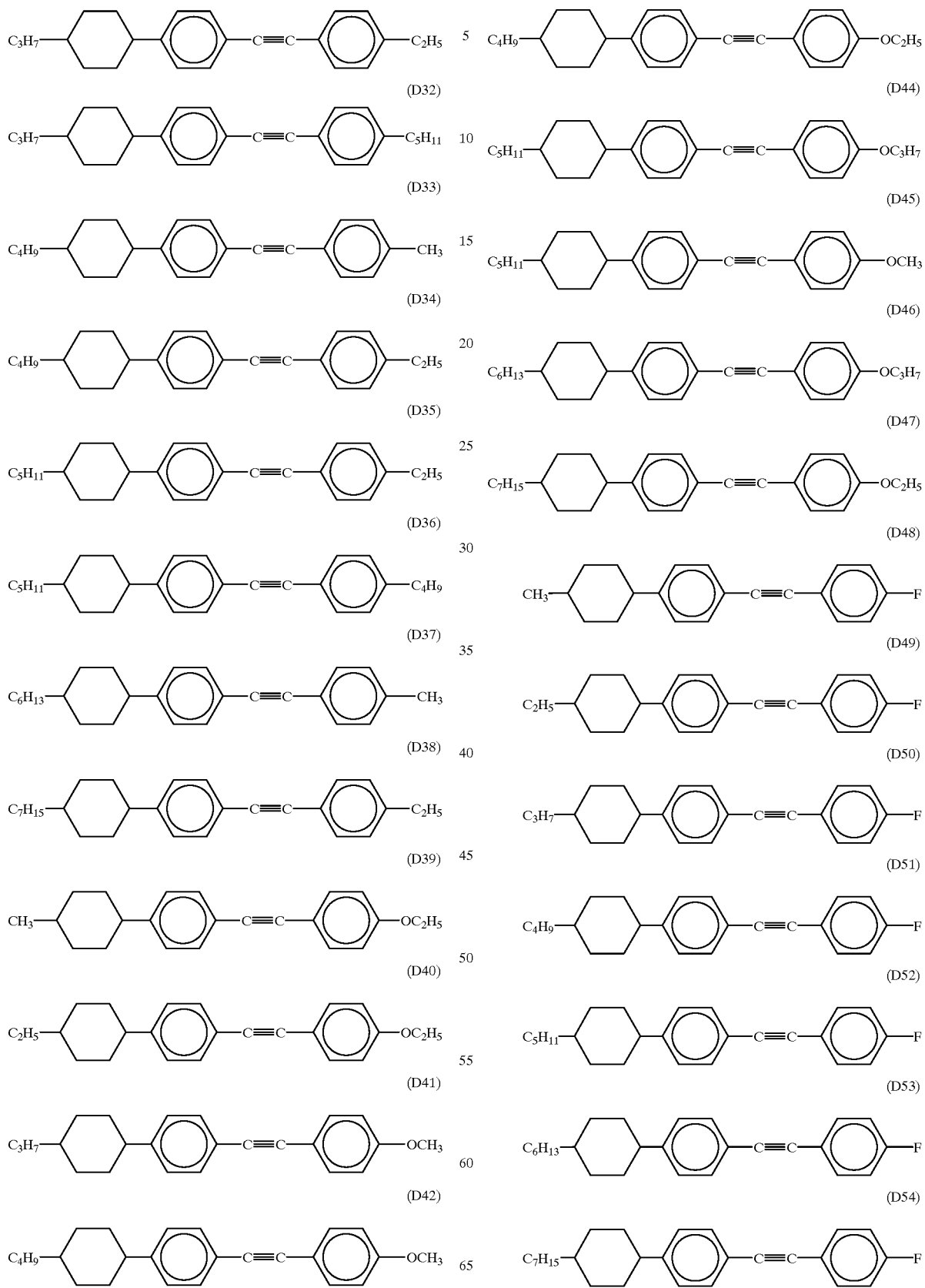

-continued (D55)
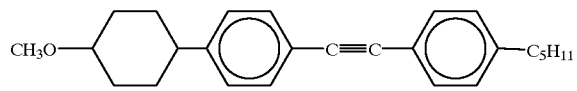

(D56)
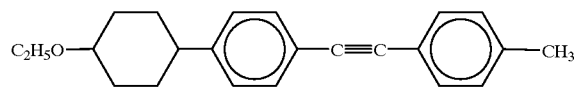

(D57)
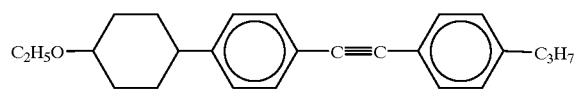

(D58)
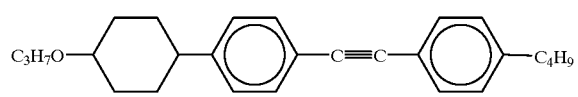

(D59)
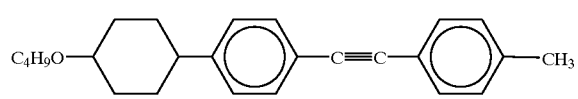

(D60)
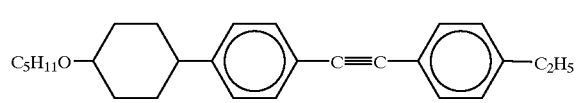

(D61)
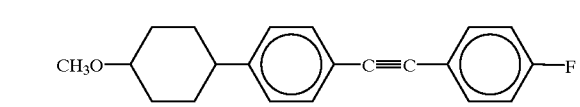

(D62)
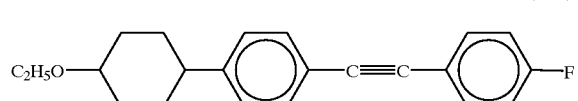

(D63)
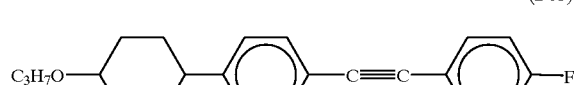

(D64)

(D65)

(D66)

-continued (D67)
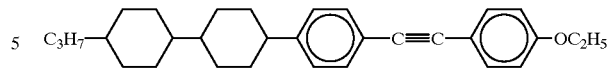

(D68)
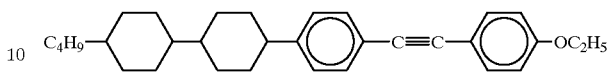

(D69)
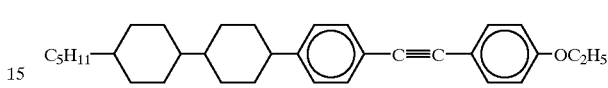

(D70)
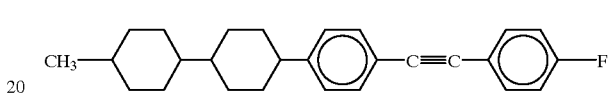

(D71)
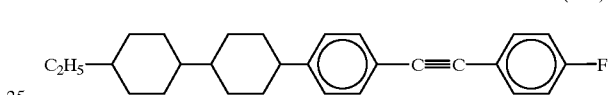

(D72)
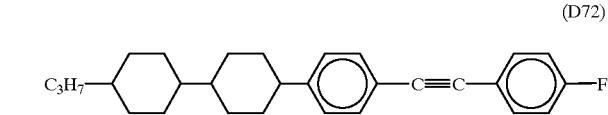

(D73)

(D74)

(D75)

(D76)

A chiral agent is an additive which, when it is added to nematic liquid crystal, twists molecules of the nematic liquid crystal. When a chiral agent is added to nematic liquid crystal, the liquid crystal molecules form a helical structure with uniform twist intervals, and thereby, the liquid crystal exhibits a cholesteric phase.

Chiral nematic liquid crystal has an advantage that the pitch of the helical structure can be changed by changing the concentration of the chiral agent, whereby the wavelength of light to be reflected by the liquid crystal can be controlled. Generally, as a term expressing the pitch of the helical structure of liquid crystal molecules, the term "helical pitch" which is defined as the distance between liquid crystal molecules which are located at an angle of 360 degrees to each other along the helical structure is used.

For example, biphenyl compounds, tarphenyl compounds, ester compounds, pyrimidine compounds, azoxy compounds, etc. are usable as the chiral agent. Chiral agents in the market, S811, R811, CB15, S1011 and R1011 made by Merck & Company and CM31, CM32, CM33 and CM34 made by Chisso Corporation, etc. which have an optically active group in an end are usable. Also, cholesteric liquid crystal with a cholesteric ring, of which typical example is cholesteric nonanoate, is usable.

It is possible to use two or more chiral agents. Addition of a plurality of chiral agents to nematic liquid crystal prevents the wavelength of light selectively reflected by the produced liquid crystal composition from shifting with a change in temperature.

The total amount of the chiral agents contained in the liquid crystal composition is desirably within a range from 10 wt % to 40 wt % of the liquid crystal composition and more desirably within a range from 15 wt % to 35 wt %. If the content of the chiral agents is less than 10 wt %, there is a possibility that the liquid crystal composition may not selectively reflect light of a desired wavelength. If the content of the chiral agents is over 40 wt %, the liquid crystal composition may not exhibit a cholesteric phase at room temperature or may be solidified.

As the coloring agent contained in the liquid crystal composition, various conventional coloring agents such as azo compounds, quinone compounds, antraquinone compounds, etc. and dichroic dyes are usable. It is possible to use a plurality of these coloring agents. The total amount of the coloring agents contained in the liquid crystal composition is desirably not more than 5 wt % of the liquid crystal composition and more desirably not more than 3 wt %.

It is possible to use a color filter instead of adding a coloring agent to the liquid crystal composition. In this case, the color filter may be made of a material which is prepared by adding a coloring agent to a transparent substance. A material which is originally colored is also usable for the color filter, and the color filter may be a thin film of a substance which substantially functions as a coloring agent. Instead of providing a color filter layer, it is possible to replace a transparent substrate with such a color filter.

The ultraviolet-ray absorber contained in the liquid crystal composition is to prevent the liquid crystal composition from aging because of ultraviolet rays, for example, from fading and from degrading in responsibility, etc. Benzophenone compounds, benzotriazole compounds, salicylate compounds, etc. are usable. The content of the ultraviolet-ray absorber in the liquid crystal composition is desirably not more than 5 wt % of the liquid crystal composition and more desirably not more than 3 wt %.

For the columnar nodules 115, for example, thermoplastic resin can be used. The material of the columnar nodules 115 is required to be softened by heat, to be hardened by cool, not to react chemically to the liquid crystal material used and to have appropriate elasticity. Also, thermosetting resin and photosetting resin are usable.

Figure 2:
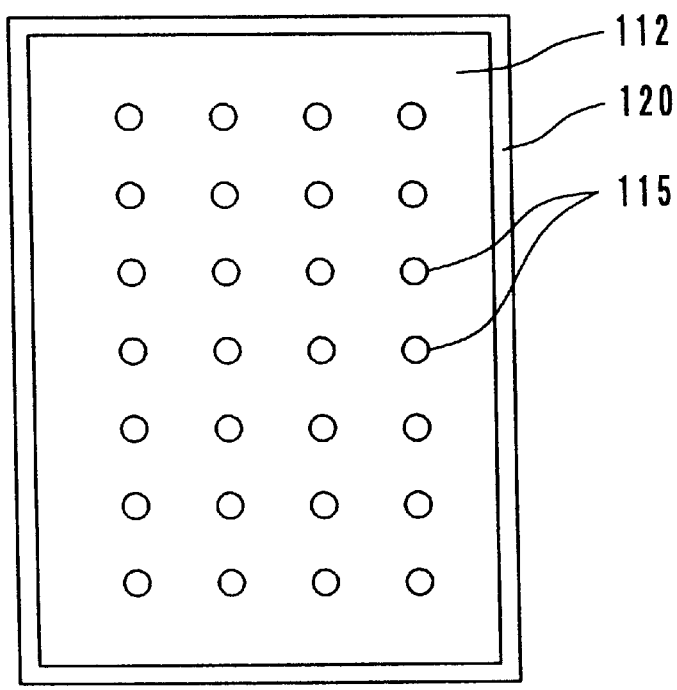
FIG. 2 is a plan view of a film type substrate of the liquid crystal display on which resin nodules and a sealant are formed.
Figure 3:
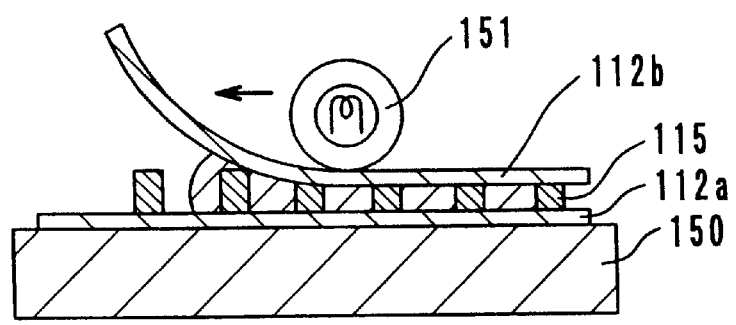
FIG. 3 is an illustration which shows a manufacturing process of the liquid crystal display.

The columnar nodules 115 are formed by a conventional printing method. As FIG. 2 shows, the material is printed into dots by use of a pattern. The size of the sections, the arrangement pitch and the shape (cylinders, drums, square poles, etc.) of the nodules are determined depending on the size of the liquid crystal display 100 and the image resolution. It is preferred to arrange the columnar nodules 115 among the electrodes 113 so that the transmittance will be higher.

The spacers 117 are preferably particles of a rigid material which never be deformed by heat and/or pressure. For example, inorganic materials such as fine particles of glass fiber, balls of glass silicate, aluminum powder, etc. and particles of organic synthetic materials such as divinyl benzene bridged polymer, polystyrene bridged polymer, etc. are usable.

Thus, the rigid spacers 117 are provided between two substrates 112 to keep a specified gap in-between, and the resin nodules 115 made of a material mainly containing thermoplastic polymer are arranged in a specified pattern within the displaying area to support and bond the substrates 112. In the structure, the substrates 112 are entirely supported firmly, and alignment unevenness of the liquid crystal and occurrence of bubbles in the liquid crystal under low temperature can be prevented. The spacers 117 are not indispensable.

An exemplary method of producing the liquid crystal display 100 is briefly described.

On each of two transparent substrates, a plurality of transparent electrodes are formed. The transparent electrodes are formed by sputtering an ITO film on each of the substrates and by patterning the ITO film by photolithography.

Next, transparent insulating layers and alignment controlling layers are formed on the transparent electrodes of the respective substrates. The insulating layers and the alignment controlling layers are formed of an inorganic material, e.g., silicon oxide or an organic material, e.g., polyimide resin by a conventional method such as sputtering, spin coating, roll coating or the like. The alignment controlling layers are not subjected to a rubbing treatment. Although the function of such alignment controlling layers is not clear, it is considered that alignment controlling layers provide liquid crystal molecules with an anchoring effect more or less, which results in preventing the liquid crystal display from changing in characteristics as time goes by. Also, a coloring agent may be added to these layers so that these layers will also function as color filters. Thereby, the color purity and the contrast can be improved.

On one of the substrates which have obtained the transparent electrodes, the insulating layers and the alignment controlling layers in this way, columnar nodules are formed on the surface with electrodes thereon. For the columnar nodules, paste of a resin material which is prepared by dissolving resin in a solvent is used. A printing method in which the resin paste is extruded by a squeegee via a screen, a metal mask or the like on the substrate placed on a planar stage, a dispenser method or an ink jet method in which the resin material is ejected onto the substrate from the end of a nozzle, and a transfer method in which the resin material is supplied to a plate or a roller and thereafter transferred onto the substrate can be adopted to form the resin nodules. The resin nodules, when they are formed, preferably have a height larger than the desired thickness of the display layer.

On the electrode surface of the other substrate, a sealant made of ultraviolet setting resin, thermosetting resin or the like is provided. The sealant is formed into an endless ring along the periphery of the substrate. To form the sealant, a dispenser method or an ink jet method in which the resin material is ejected from the end of a nozzle onto the substrate, a printing method using a screen, a metal mask or the like, and a transfer method in which the resin material is supplied to a plate or a roller and thereafter transferred onto the substrate can be adopted. Further, on at least one of the substrates, spacers are dispersed by a conventional method.

These two substrates are laminated together with the respective surfaces with electrodes thereon facing each other, and the laminate of substrates is heated while being pressed from both sides. The application of heat and pressure can be carried out, for example, in the way illustrated by FIG. 3. The substrate 112a with the columnar nodules 115 thereon is placed on a plate 150, and the other substrate 112b is placed on the substrate 112a. A heating/pressing roller 151 rolls over the substrate 112b from an end while heating and pressing the substrates 112a and 112b, that is, while the substrates 112a and 112b are passing through between the roller 151 and the plate 150 being pressed and heated, the substrates 112a and 112b are laminated together. In this way, even when elastic flexible substrates such as film type substrates are used, it is possible to fabricate a cell accurately. If the columnar nodules are made of thermoplastic polymer, the columnar nodules are softened by heat and hardened by cool, whereby the substrates can be bonded together by the columnar nodules. If the sealant is made of thermosetting resin, the sealant can be hardened by the heat during this laminating process.

In the laminating process, a liquid crystal material is dropped on one of the substrates, and the liquid crystal material is filled between the substrates while the substrates are laminated together. The liquid crystal material contains spacers, and the material is dropped on the electrode surface of at least one of the substrates.

The liquid crystal material is dropped on the substrates at an end, and the liquid crystal material is spread over to the other end while the roller is rolling over the substrates to laminate the substrates together. In this way, the liquid crystal material is filled in the whole area of the space between the substrates. By adopting this laminating method, it is possible to suppress intake of bubbles into the liquid crystal material in the laminating process.

Thereafter, the application of pressure to the substrates is continued until the temperature of the substrates falls down to at least the softening point of the resin material of the columnar nodules. Further, if the sealant is made of photo-setting resin, radiation is carried out to harden the sealant.

In the same procedure, the blue display cell, the green display cell and the red display cell are fabricated while using different liquid crystal materials which selectively reflect light of mutually different wavelengths. These three cells are laminated and bonded together, and a light absorbing layer is provided on the bottom of the lowermost cell. Finally, a full-color liquid crystal display is fabricated.

The above-described liquid crystal display 100 has resin columnar nodules in the displaying area. This structure permits fabrication of a liquid crystal display which is light and which is excellent in display performance by use of film type substrates. This structure also permits easy fabrication of a large-scale liquid crystal display and fabrication of a liquid crystal display which requires a relatively low driving voltage, which is strong against shock and which has various other advantages.

However, the liquid crystal display with a memory effect is not necessarily of this structure. It is possible to structure the liquid crystal display layer to be a polymer-dispersed type composite layer in which liquid crystal is dispersed in a conventional three-dimensional polymer net or in which a three-dimensional polymer net is formed in liquid crystal.

Driving Circuit; See FIG. 4

Figure 4:
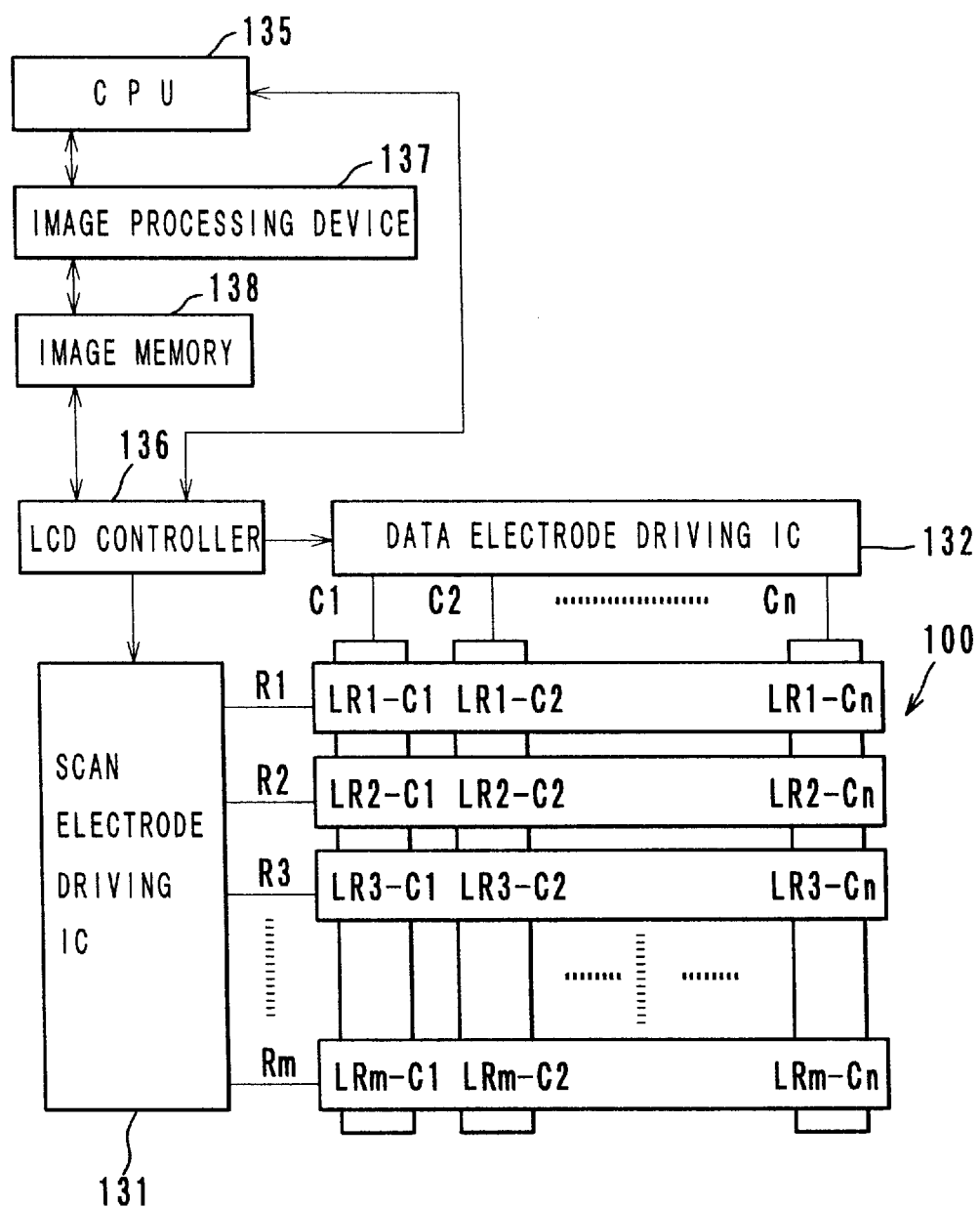
FIG. 4 is a block diagram which shows a driving circuit of the liquid crystal display.

As FIG. 4 shows, the pixels of the liquid crystal display 100 are structured into a matrix which is composed of a plurality of scan electrodes R1, R2, . . . Rm and a plurality of data electrodes C1, C2, . . . Cn (n, m: natural numbers). The scan electrodes R1, R2 . . . Rm are connected to output terminals of a scan electrode driving IC 131, and the data electrodes C1, C2, . . . Cn are connected to output terminals of a data electrode driving IC 132.

The scan electrode driving IC 131 outputs a selective signal to a specified one of the scan electrodes R1, R2, . . . Rm while outputting a non-selective signal to the other scan electrodes R1, R2, . . . Rm. The scan electrode driving IC 131 outputs the selective signal to the scan electrodes R1, R2, . . . Rm one by one at specified time intervals. In the meantime, the data electrode driving IC 132 outputs signals to the data electrodes C1, C2, . . . Cn simultaneously in accordance with image data to write the pixels on the selected scan electrode. For example, while a scan electrode Ra (a≦m, a: natural number) is selected, the pixels LRa-C1 through LRa-Cn on the intersections of the scan electrode Ra and the data electrodes C1, C2, . . . Cn are written simultaneously. In each pixel, the voltage difference between the scan electrode and the data electrode is a voltage for writing the pixel (writing voltage), and each pixel is written in accordance with this writing voltage.

The driving circuit of the liquid crystal display 100 comprises a CPU 135, an LCD controller 136, an image processing device 137, and image memory 138 and the driving ICs (drivers) 131 and 132. In accordance with image data stored in the image memory 138, the LCD controller 136 controls the driving ICs 131 and 132. Thereby, voltages are applied between the scan electrodes and the data electrodes of the liquid crystal display 100 serially, so that an image is written on the liquid crystal display 100. The structures of the driving ICs 131 and 132 will be described in detail later.

Further, when writing on part of the liquid crystal display 21, only specified scan electrodes including the part shall be selected. In this way, writing is carried out on only necessary part of the liquid crystal display, which requires a shorter time.

Writing can be carried out in the above-described way. If an image is displayed on the liquid crystal display, preferably, all the pixels are reset to the same state before writing a new image so that the newly written image will not be influenced by the previously displayed image. The reset of all the pixels may be carried out simultaneously or may be serially by scan electrode.

When writing on part of the liquid crystal display 21, the scanning lines in the part to be subjected to writing may be reset serially or may be reset at one time.

Driving Principle; See FIGS. 5 and 6

First, the principle of a method of driving the liquid crystal display 100 is described. Although specific examples which use alternated pulse waveforms will be described in the following paragraphs, the driving method does not necessarily use such waveforms. As FIG. 5 shows, the driving method generally comprises a reset step Tr, a selection step Ts, an evolution step Te and a display step Td.

In the upper section of FIG. 5, a driving waveform which is applied to liquid crystal (LCD1) corresponding to a pixel is shown, and in the lower section, the state of the liquid crystal in each of the steps is schematically illustrated. As FIG. 5 shows, in the example, the reset step Tr is twice as long as that of the selection step Ts, and the evolution step Te is thrice as long as that of the selection step Ts. Accordingly, for writing of one line, it takes a time which is equal to six times as long as the selection step Ts, and in sequential scanning, the observer sees a dark strip corresponding to six scanning lines running.

In the reset step Tr, first, a voltage with an absolute value of Vr is applied to the pixels on a scanning line to be written, and thereby, the pixels on the scanning line are reset to a homeotropic state (see "a" in FIG. 5).

In the selection Ts, a selection pulse which is to select the final state of the liquid crystal is applied to the liquid crystal. The selection step Ts is composed of three steps (a pre-selection step Ts1, a selection pulse application step Ts2 and a post-selection step Ts3). In the pre-selection step Ts1, the voltage applied to the pixels on the scanning line to be written is made zero. Thereby, the liquid crystal of the pixels on the scanning line are untwisted a little (to come to a first transient state, see "b" in FIG. 5). Next, in the selection pulse application step Ts2, a selection pulse in accordance with the image to be displayed is applied to each of the pixels on the scanning line. In the selection pulse application step Ts2, the pulse waveform applied to pixels which are desired to finally come to a planar state is different from the pulse waveform applied to pixels which are desired to finally come to a focal-conic state. Therefore, the steps after the selection pulse application step Ts2 will be described with respect to a pixel which is desired to finally come to a planar state and with respect to a pixel which is desired to finally come to a focal-conic state separately.

In selecting a planar state as the final state of a pixel, in the selection pulse application step Ts2, a selection pulse with an absolute value of Vse1 is applied to the pixel, and thereby, the liquid crystal of the pixel comes to a homeotropic state again (see "c1" in FIG. 5). Thereafter, in the post-selection step Ts3, the voltage applied to the pixel is made zero, and thereby, the liquid crystal is untwisted a little (see "d1" in FIG. 5). This state is almost equal to the first transition state.

In the evolution step Te, first, a pulse voltage with an absolute value of Ve is applied to the pixels on the scanning line to be written. The liquid crystal of the pixel, which has been untwisted a little in the selection step Ts, is completely untwisted by the application of the pulse voltage Ve, and the liquid crystal comes to a homeotropic state (see "e1" in FIG. 5).

In the display step Td, the voltage applied to the liquid crystal section of the pixel is made zero. Thereby, the liquid crystal in a homeotropic state comes to a planar state (see "f1" in FIG. 5). In this way, selection/evolution of a pixel to a planar state is carried out.

In selecting a focal-conic state as the final state of a pixel, in the selection pulse application step Ts2, the voltage applied to the liquid crystal section of the pixel is made zero, and thereby, the liquid crystal is untwisted further (comes to a second transient state, see "c2" in FIG. 5). In the post-selection step Ts3, as in the case of selecting a planar state, the voltage applied to the liquid crystal section is made zero. Thereby, the liquid crystal is untwisted and comes to a state in which the helical pitch is widened approximately double (comes to a third transient state, see "d2" in FIG. 5). This state is considered to be almost equal to the transient planar state taught by U.S. Pat. No. 5,748,277.

Next, in the evolution step Te, as in the case of selecting a planar state, a pulse voltage with an absolute value of Ve is applied to the pixels on the scanning line to be written. The liquid crystal of the pixel, which has been untwisted a little in the selection step Ts, comes to a focal-conic state by the application of the pulse voltage Ve (comes to a fourth transient state, see "e2" in FIG. 5).

In the display step Td, as in the case of selecting a planar state, the voltage applied to the liquid crystal is made zero. The liquid crystal in a focal-conic state stays in the focal-conic state even after the voltage is made zero. In this way, selection/evolution of a pixel to a focal-conic state is carried out (see "f2" in FIG. 5).

Thus, depending on the selection pulse applied to liquid crystal in the middle short period of the selection step Ts, that is, in the selection pulse application step Ts2, the final state of the pixel is selected. Further, by adjusting the pulse width of the selection pulse and more specifically by changing the form of the pulse applied to the data electrode in accordance with image data, intermediate tones can be displayed.

Making the voltage applied to the liquid crystal zero in the pre-selection step Ts1 and in the post-selection step Ts3, that is, setting break times permits use of a simple driver structure as will be described later, which contributes to reduction of cost. Needless to say, the voltage is not necessarily made zero but may be set to a voltage which is almost zero and is not actually effective.

Figure 6:
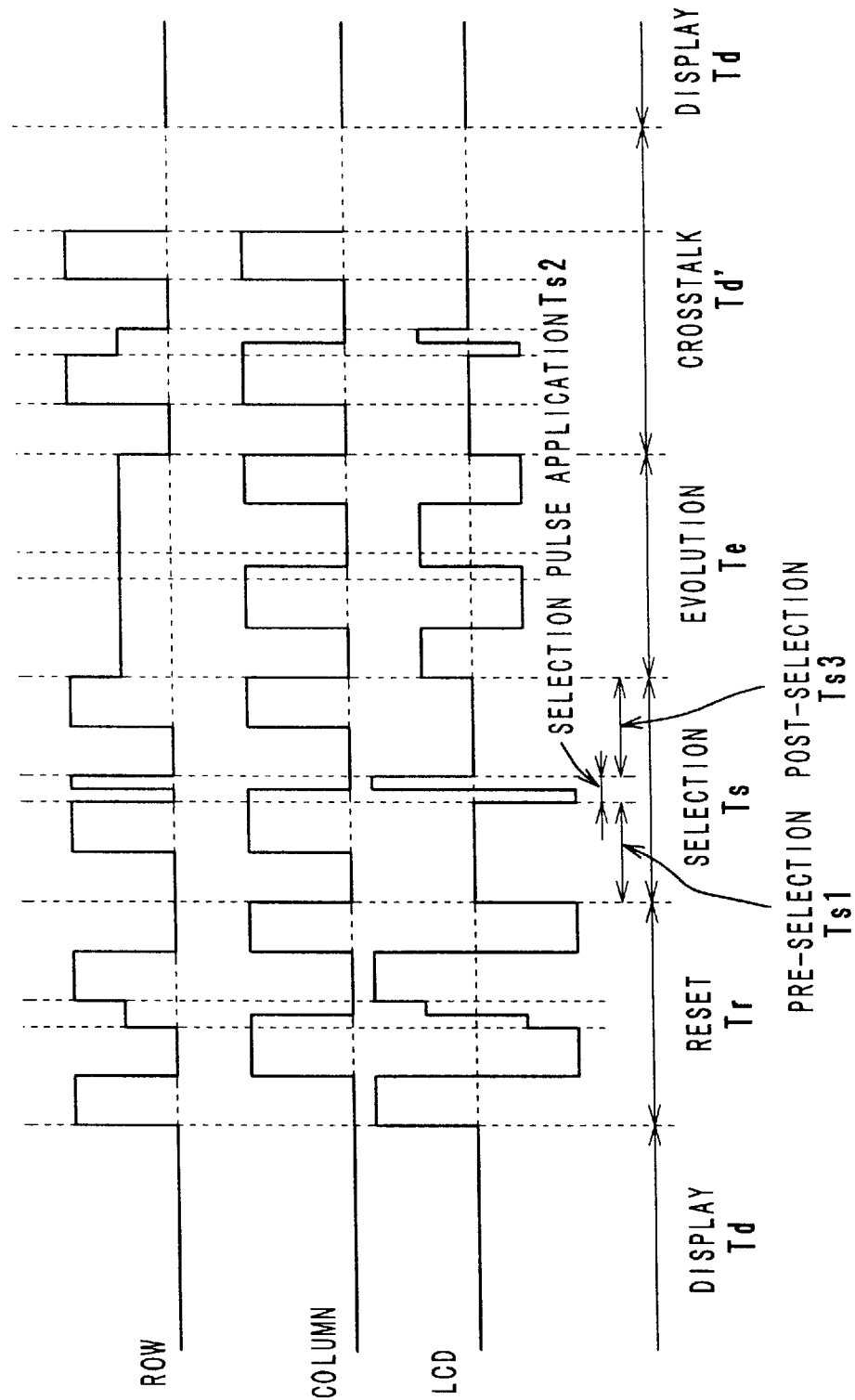
FIG. 6 is a chart which shows driving waveforms based on the driving method.

FIG. 6 shows the waveform of a voltage which is applied to one of a plurality of pixels arranged in a matrix and exemplary waveforms applied to the scan electrode (row) and the data electrode (column) to obtain the voltage waveform acting on the pixel. On the contrary, in FIG. 6, "ROW" means a scan electrode, "COLUMN" means a data electrode, and "LCD" means the liquid crystal corresponding to the pixel which is the intersection between the ROW and the COLUMN.

As FIG. 6 shows, in the matrix driving method, after the evolution step Te of a scan electrode, data are written on the pixels on another scan electrode, and the pixels on which writing has been done are influenced by a specified voltage as a crosstalk voltage through the data electrodes. The step in which the crosstalk voltage is applied is referred to as a crosstalk step Td'. The pulse width and the energy of the crosstalk voltage are too narrow and too small to influence the liquid crystal.

All the scan electrodes have been selected, and when the evolution step Te of the last selected scan electrode is over, the other scan electrodes has gone through the crosstalk step Td'. Then, the voltages applied to all the scan electrodes and the data electrodes are made zero, and the whole liquid crystal comes to the display step Td. This state is maintained until the next writing is started.

In FIG. 6, for simplification, the lengths of the reset step Tr, the selection step Ts, the evolution step Te and the crosstalk step Td' are shown to be equal to one another. For the same reason, the signal sent to the COLUMN is shown as a waveform to select all the pixels to come to a planar state.

In the following, specific examples of a matrix driving waveform according to the first driving principle is described. In the following first through fourth examples, "ROW1", "ROW2" and "ROW3" mean three scan electrodes which are serially selected, "COLUMN" means a data electrode which crosses the three scan electrodes (ROWS 1–3), and "LCD1", "LCD2" and "LCD3" mean liquid crystal corresponding to the pixels on the intersections between the ROWS 1–3 and the COLUMN.

First Example of Matrix Driving; See FIG. 7

As described above, the driving method comprises a reset step, a selection step, an evolution step and a crosstalk step. Further, the selection step has a pre-selection step, a selection pulse application step and a post-selection step, and a selection pulse is applied to the pixel only in part of the selection step.

The form of the selection pulse must be changed according to image data to be written on the pixel, and selection pulses of different forms in accordance with image data must be applied to the column. On the other hand, at the pre-selection step and at the post-selection step of every pixel, the voltage applied thereto is zero, and a combination of specified pulse waveforms to be applied to the rows and the columns to cause application of 0 volt to the pixels can be used. In the first example shown by FIG. 7, by using this, reset, evolution and display are carried out simultaneously on the pixels on a plurality of scan electrodes.

For example, while the LCD 2 is in the pre-selection step, pulses of a voltage +V1 which are out of phase with each other are applied to the ROW2 and ROW3, and a voltage +V½ is applied to the ROW1. At this time, if a pulse of +V1 which is out of phase with the pulse applied to the ROW3 is applied to the COLUMN, a reset pulse of ±Vr=±V1 is applied to the LCD3, 0 volt is applied to the LCD2, and an evolution pulse ±Ve=±V½ is applied to the LCD1.

While the LCD2 is in the selection pulse application step, a data pulse of a form in accordance with image data (of a voltage +V1) is applied to the COLUMN. Accordingly, a voltage of +V½ is applied to the ROW1 and the ROW2 so that a voltage of ±V½ can be applied to the LCD1 and the LCD3. A pulse of a voltage +V1 is applied to the ROW2, so that the voltage difference (+V1 or 0) between the voltage applied to the ROW2 and the data pulse applied to the COLUMN is applied to the LCD2 as a selection pulse of a voltage ±Vse1. By changing the form of the data pulse applied to the COLUMN, the pulse width of the selection pulse can be changed.

In the post-selection step, the same process as in the pre-selection step is carried out. Specifically, pulses which are of a voltage +V1 but are out of phase are applied to the ROW2 and the ROW3, and a pulse of a voltage +V½ is applied to the ROW1. At this time, a pulse of a voltage +V1 which is out of phase with the pulse applied to the ROW3 is applied to the COLUMN. Thereby, a reset pulse of ±Vr=±V1 is applied to the LCD3, 0 volt is applied to the LCD2, and an evolution pulse ±Ve=±V½ is applied to the LCD1.

In the steps other than the reset step, the selection step and the evolution step, pulses in phase with the data pulses applied to the data electrode in the pre-selection step and in the post-selection step are applied, and while any of the other scan electrodes is in the selection pulse application step, a pulse of a voltage +V½ is applied. Thereby, to the part of the liquid crystal corresponding to this pixel, a crosstalk voltage ±V½ with the same pulse width as that of the selection pulse is applied. The pulse width of this crosstalk voltage is too narrow to change the state of the liquid crystal.

By applying the above-described pulses to the scan electrodes repeatedly, an image is displayed on the liquid crystal display. The scan electrodes may be selected one after another or may be selected one by one in an arbitrary order. Also, because it is possible to apply the reset pulse, the selection pulse and the evolution pulse to any desired scan electrodes, partial writing of the liquid crystal display is possible.

In the first example, the driving IC for the rows (scan electrodes) has three output levels (V1, V½ and GND), and the driving IC for the columns (data electrodes) has two output levels (V1 and GND).

Figure 8:
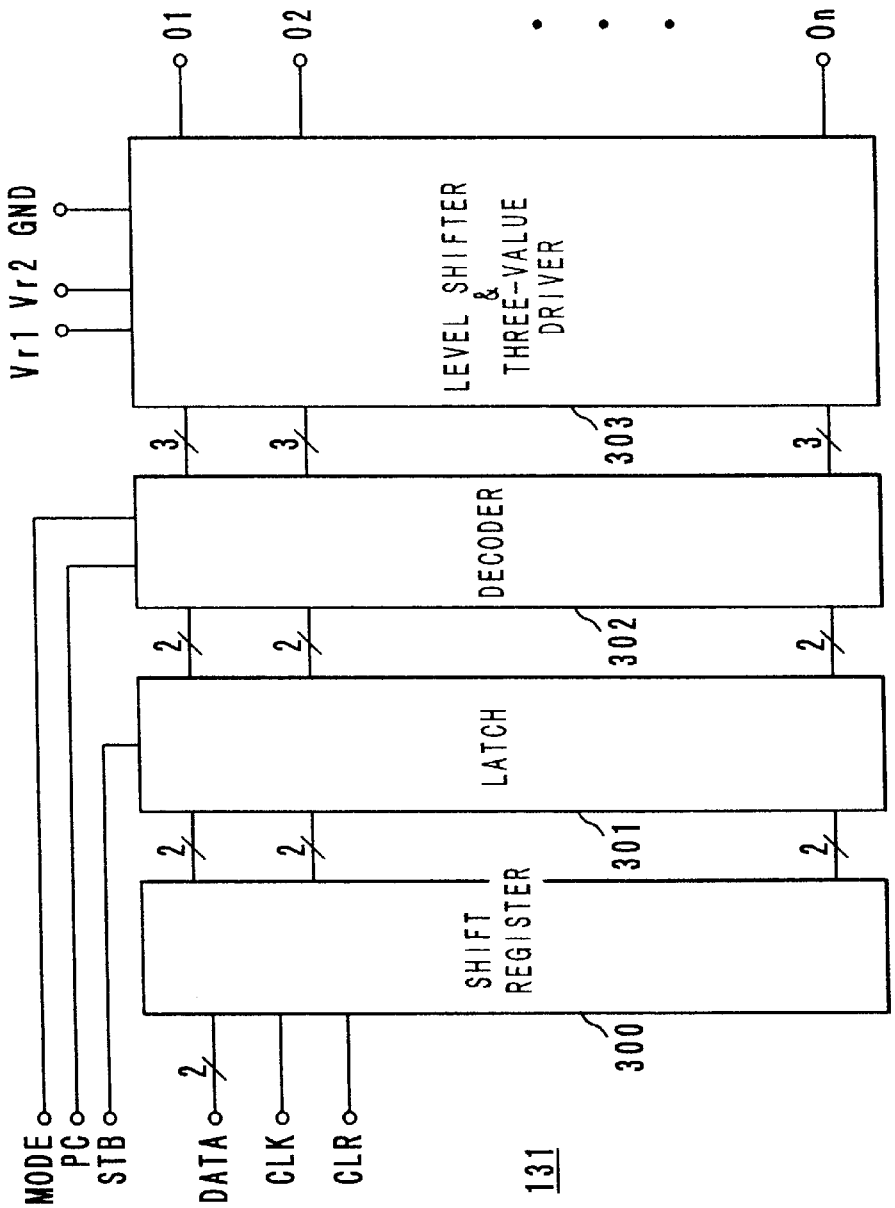
FIG. 8 is a block diagram which shows a scan electrode driving IC used in the first driving example.
Figure 9:
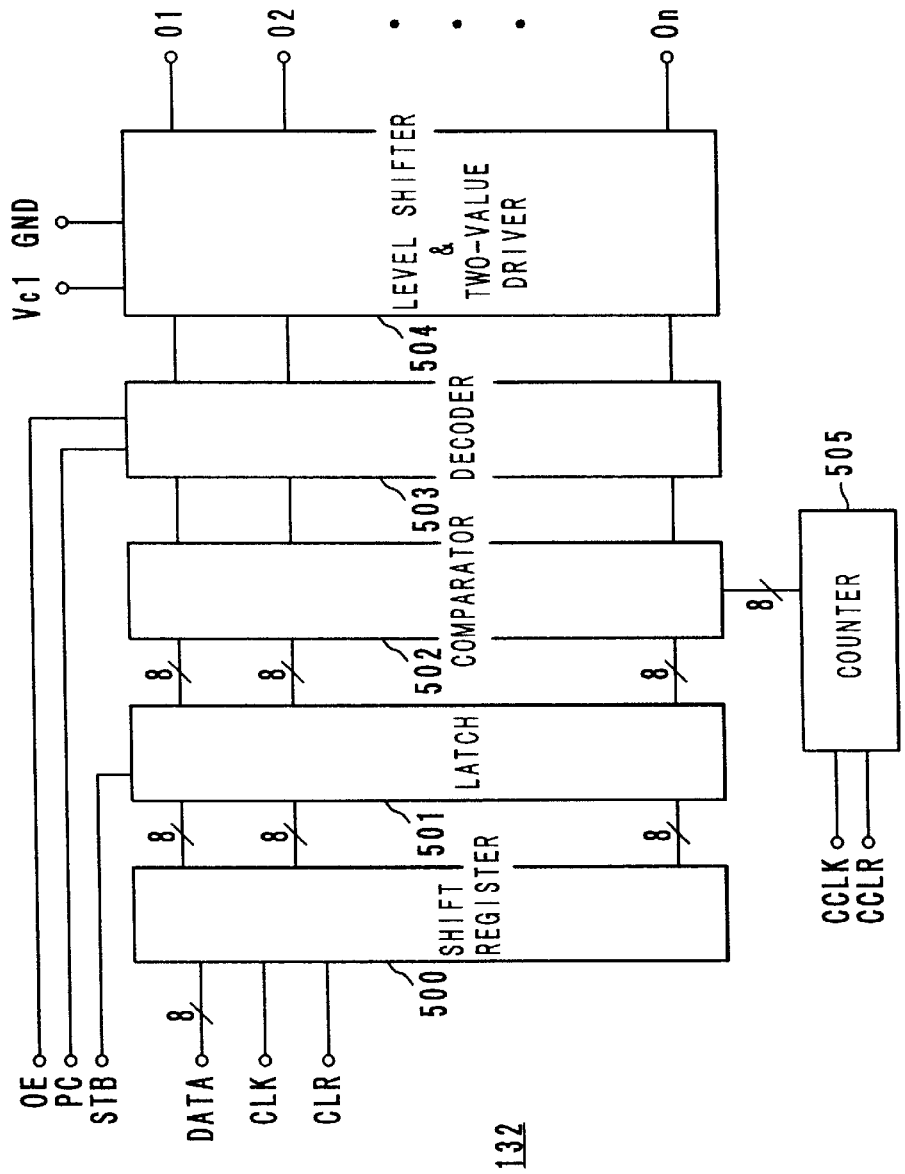
FIG. 9 is a block diagram which shows a data electrode driving IC used in the first driving example.

Exemplary Driving ICs for the First Example of Matrix Driving;

See FIGS. 8 and 9

Figure 7:
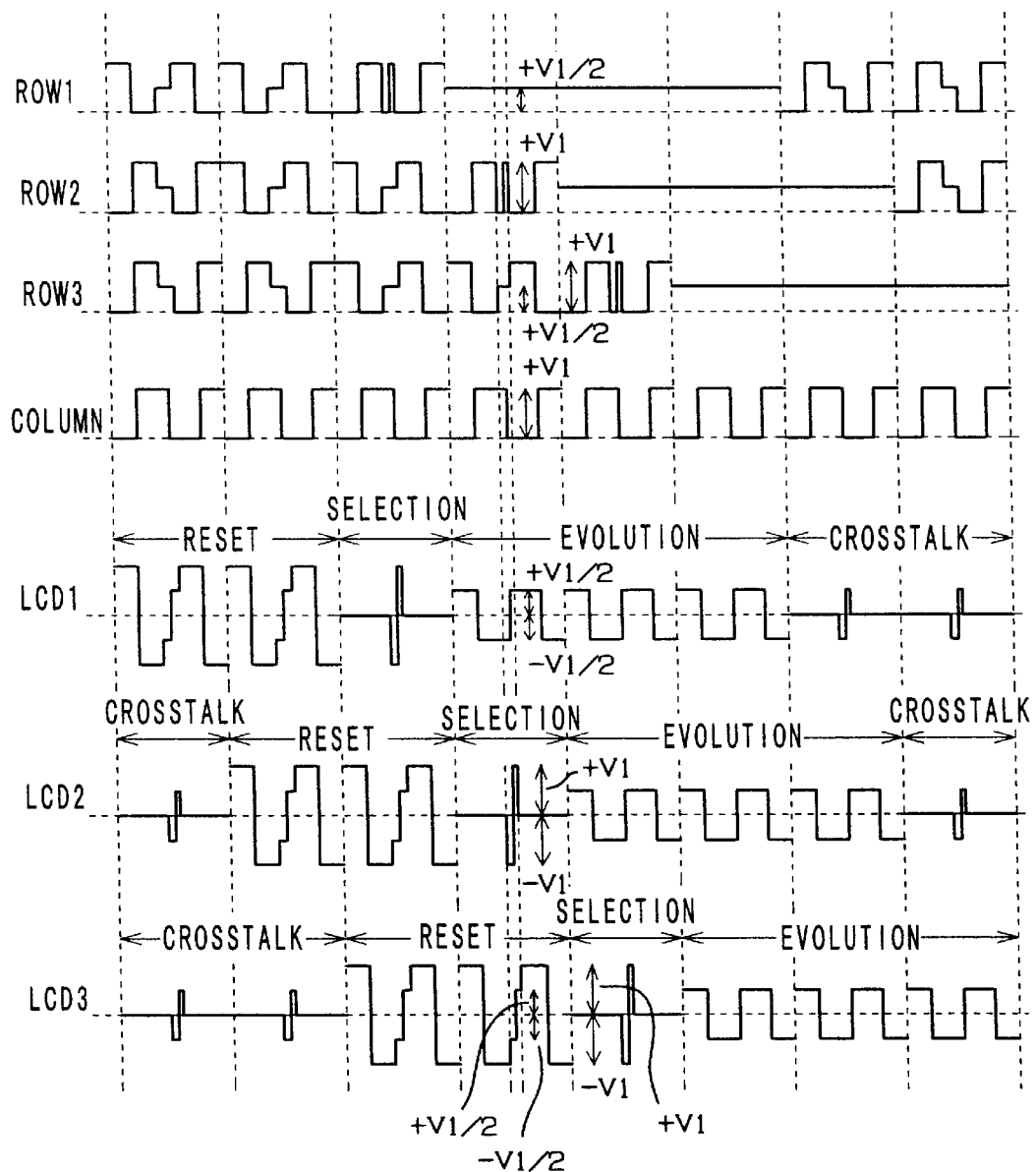
FIG. 7 is a chart which shows driving waveforms in a first driving example.

FIG. 8 shows the internal circuit of the scan electrode driving IC 131 which outputs the driving waveform shown in FIG. 7. The scan electrode driving IC comprises a shift register 300, a latch 301, a decoder 302 and a level shifter/three-value driver 303 with a high withstand voltage. In the scan electrode driving IC 131, a mode switch signal MODE and a polarity conversion signal PC are inputted to the decoder 302. A strobe signal STB is inputted to the latch 301. A data signal DATA, a shift clock signal CLK and a clear signal CLR are inputted to the shift register 300. These signals are sent from the LCD controller 136. Signals which will be described later are sent from the LCD controller 136 unless there is any particular description.

Operation of the driving IC 131 is described. In response to the two-bit data signal DATA and the shift clock signal CLK, the shift register 300 sets two-bit data therein. Next, in response to the strobe signal STB, the data set in the shift register 300 is latched in the latch 301. In response to the latched two-bit data signal DATA, the polarity conversion signal PC and the mode switch signal MODE, the decoder 302 decodes the two-bit data signal DATA and drives the level shifter/three-value driver 303. The level shifter/three-value driver 303 outputs either one of the voltages Vr1, Vr2 and GND.

Table 1 below is a truth table of the scan electrode driving IC 131. As is apparent from Table 1, in accordance with the combination of the two-bit data signals DATA1 and DATA2, the polarity conversion signal PC and the mode switch signals MODE1 and MODE2, one of the voltages Vr1, Vr2 and GND is outputted. By inputting Vr1=V1 and Vr2=V½ to the three-value driver 303, the waveforms applied to the rows shown in FIG. 7 can be outputted.

TABLE 1

| | MODE 1 | | | | MODE 2 | | |
|---|---|---|---|---|---|---|---|
| Step | DATA 1 | DATA 2 | PC | Output | DATA 1 | DATA 2 | PC | Output |
| Reset | 1 | 0 | 0 | Vr1 | 1 | 0 | 0 | Vr2 |
| Evolution | 0 | 1 | 0 | Vr2 | 0 | 1 | 0 | Vr2 |
| Display | 0 | 0 | 0 | GND | 0 | 0 | 0 | Vr2 |
| Selection | 1 | 1 | 0 | GND | 1 | 1 | 0 | GND |
| Reset | 1 | 0 | 1 | GND | 1 | 0 | 1 | Vr2 |
| Evolution | 0 | 1 | 1 | Vr2 | 0 | 1 | 1 | Vr2 |
| Display | 0 | 0 | 1 | Vr1 | 0 | 0 | 1 | Vr2 |
| Selection | 1 | 1 | 1 | Vr1 | 1 | 1 | 1 | Vr1 |

FIG. 9 shows the internal circuit of the data electrode driving IC 132 which outputs the waveform shown in FIG. 7. The data electrode driving IC 132 comprises a shift register 500, a latch 501, a comparator 502, a decoder 503, a level shifter/driver 504 with a high withstand voltage and a counter 505. In the driving IC 132, an output evasion signal OE and a polarity conversion signal PC are inputted to the decoder 503. A strobe signal STB is inputted to the latch 501. An eight-bit data signal DATA, a shift clock signal CLK and a clear signal CLR are inputted to the shift register 500. A clock signal CCLK and a clear signal CCLR are inputted to the counter 505.

Operation of the data electrode driving IC 132 is described. In response to the eight-bit data signal DATA and the shift clock signal CLK, the shift register 500 sets eight-bit data therein. Thereafter, in response to the strobe signal STB, the data set in the shift register is latched in the latch 501. Here, by using the clock signal CCLK sent to the counter 505, the output of the eight-bit data is counted. The comparator 502 compares the output of the latch 501 with the output of the counter 505, and while the output of the latch 501 is larger, the comparator 502 outputs a high-level signal. The counter 505 counts further, and when the output of the latch 501 becomes smaller, the comparator 502 outputs a low-level signal. In accordance with the output of the comparator 502, the output evasion signal OE and the polarity coversion signal PC, the decoder 503 outputs a signal to drive the level shifter/driver 504.

Table 2 below is a truth table of the data electrode driving IC 132. As is apparent from Table 2, in accordance with the combination of the output of the comparator 502, the output evasion signal OE and the polarity conversion signal PC, a voltage Vc1 or GRD is outputted. By inputting Vc1=V1, the waveform applied to the column shown in FIG. 7 can be outputted.

TABLE 2

| Output of Comparator | OE | PC | Output |
|---|---|---|---|
| 1 | 0 | 0 | Vc1 |
| 1 | 0 | 1 | GND |
| 0 | 0 | 0 | GND |
| 0 | 0 | 1 | Vc1 |
|   | 1 | 0 | All GND |
|   | 1 | 1 | All Vc1 |

Thus, because a three-value driver and a two-value driver are used for the scan electrodes and for the data electrodes respectively, the cost for the driving ICs can be reduced.

Second Example of Matrix Driving; See FIG. 10

Figure 10:
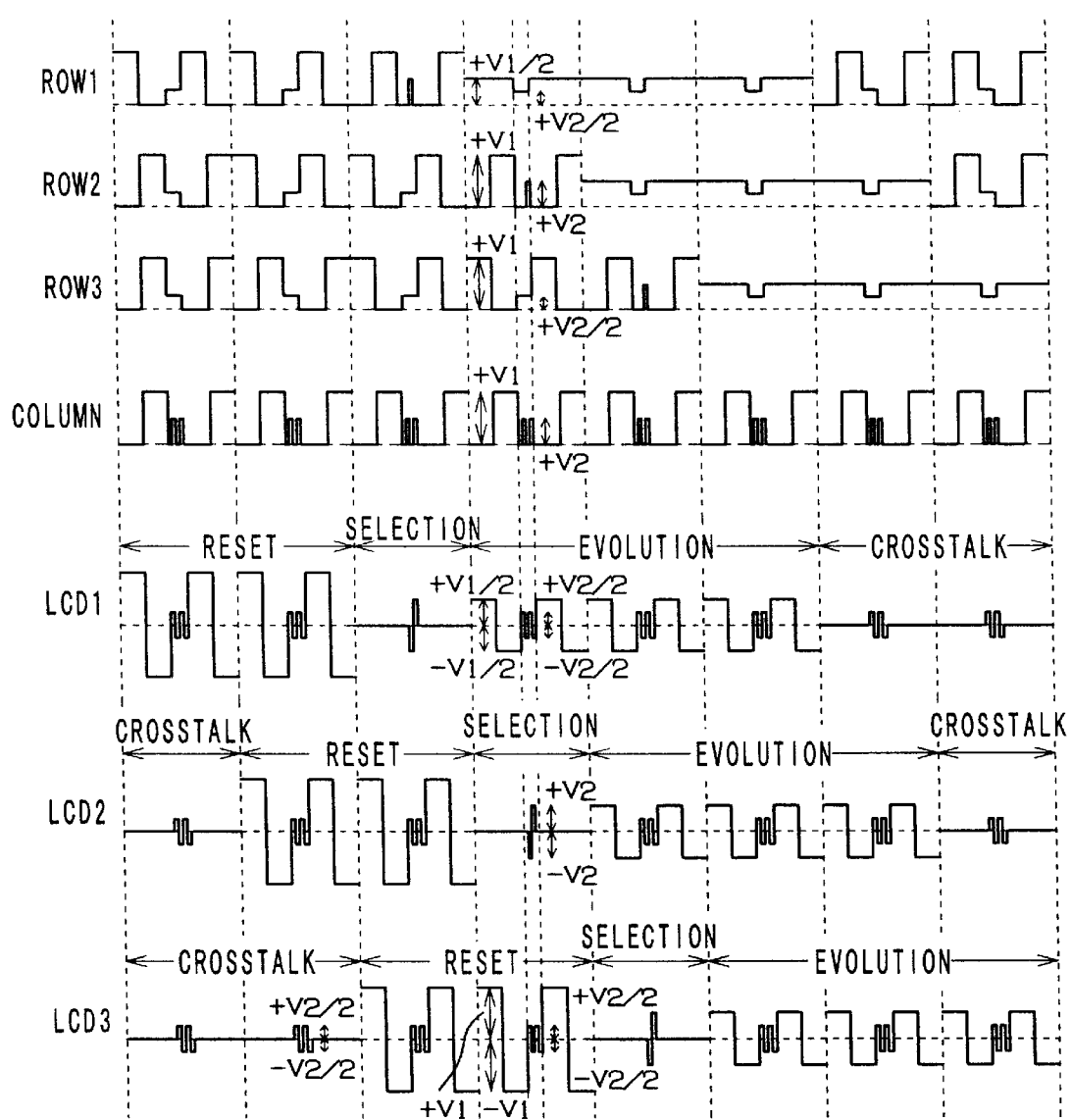
FIG. 10 is a chart which shows driving waveforms in a second driving example.

In the above-described first example, the voltage of the selection pulse Vse1 which is applied in the selection step is equal to the voltage of the reset pulse Vp=V1. In the second example, however, the voltage of the selection pulse Vse1 is V2 which is different from (lower than) the voltage V1. Setting the voltage of the selection pulse lower than the voltage of the reset pulse reduces the energy loss and facilitates control for display of intermediate tones. FIG. 10 shows driving waveforms according to the second example.

For example, while the LCD2 is in the pre-selection step, pulses which are of a voltage +V1 but are out of phase are applied to the ROW2 and the ROW3, and a voltage +V½ is applied to the ROW1. At this time, if a pulse which is of a voltage +V1 and is out of phase with the pulse applied to the ROW 3 is applied to the COLUMN, a reset pulse ±Vr=±V1 is applied to the LCD3, 0 volt is applied to the LCD2, and an evolution pulse ±Ve=±V½ is applied to the LCD1.

While the LCD2 is in the selection pulse application step, a data pulse of a form in accordance with image data (of a voltage V2) is applied to the COLUMN. At this time, pulses of a voltage +V⅔ are applied to the ROW1 and the ROW3 so that a voltage ±V⅔ will be applied to the LCD1 and LCD3. The voltage +V2 is applied to the ROW 2, so that the voltage difference between the data pulse applied to the COLUMN and the voltage +V2 (±V2 or 0) is applied to the LCD2 as a selection pulse ±Vse1. By changing the form of the data pulse applied to the COLUMN, the pulse width of the selection pulse can be changed.

In the post-selection step, application of the voltages to the ROWS 1–3 and the COLUMN is carried out in the same way as in the pre-selection step.

In the steps other than the reset step, the selection step and the evolution step, pulses in phase with the data pulse applied to the data electrode in the pre-selection step and in the post-selection step are applied, and while any of the other scan electrodes is in the selection pulse application step, a pulse of a voltage +V⅔ is applied. Thereby, to the part of the liquid crystal corresponding to this pixel, a crosstalk voltage ±V⅔ with the same pulse width as that of the selection pulse is applied. The pulse width of this crosstalk voltage is too narrow to change the state of the liquid crystal.

By applying the above-described pulses to the scan electrodes repeatedly, an image can be displayed on the liquid crystal display. Off course, partial writing on the liquid crystal display is possible.

In the second example, the driving IC for the rows (scan electrodes) has five output levels (V1, V½, V2, V⅔ and GND), and the driving IC for the columns (data electrodes) has three output levels (V1, V2 and GND).

Figure 11:
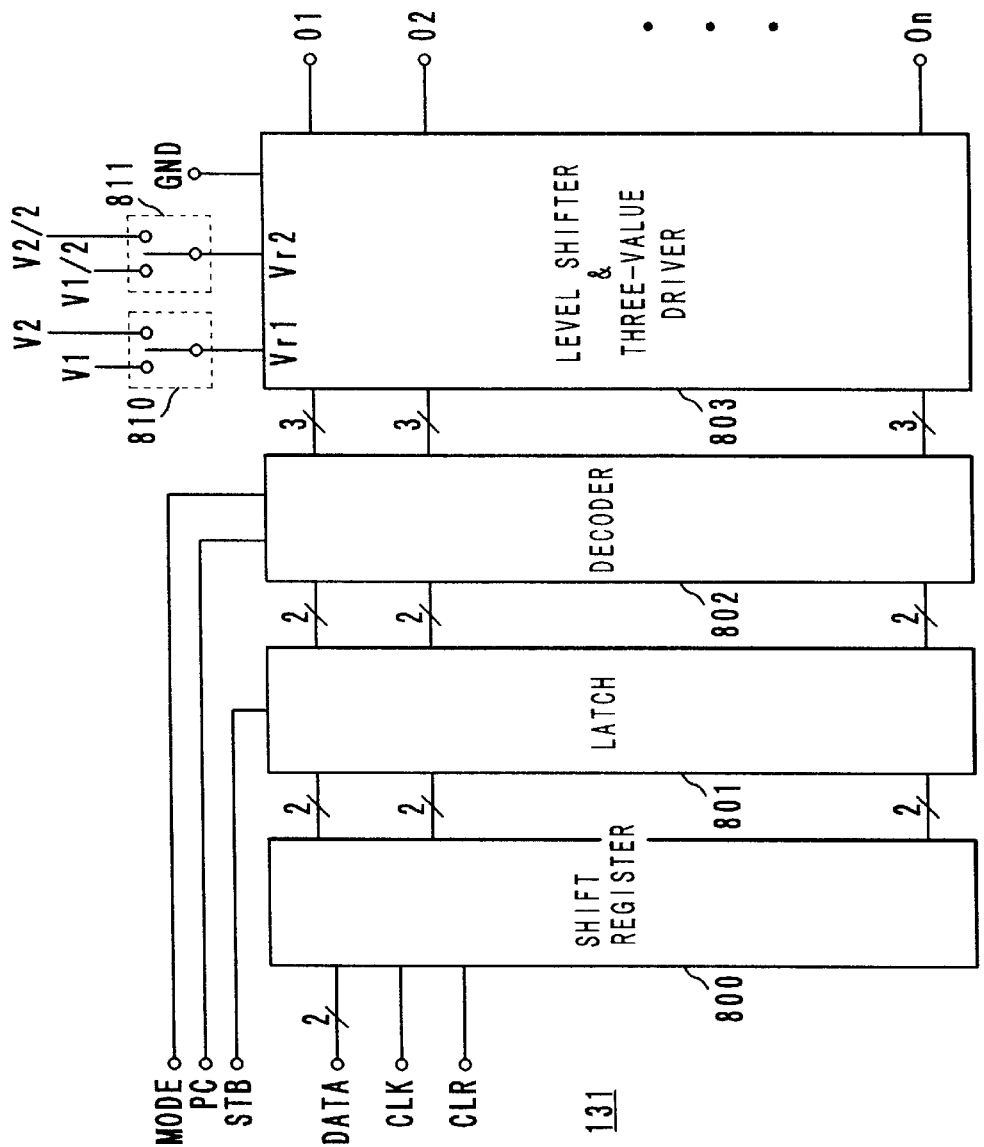
FIG. 11 is a block diagram which shows a scan electrode driving IC used in the second driving example.
Figure 12:
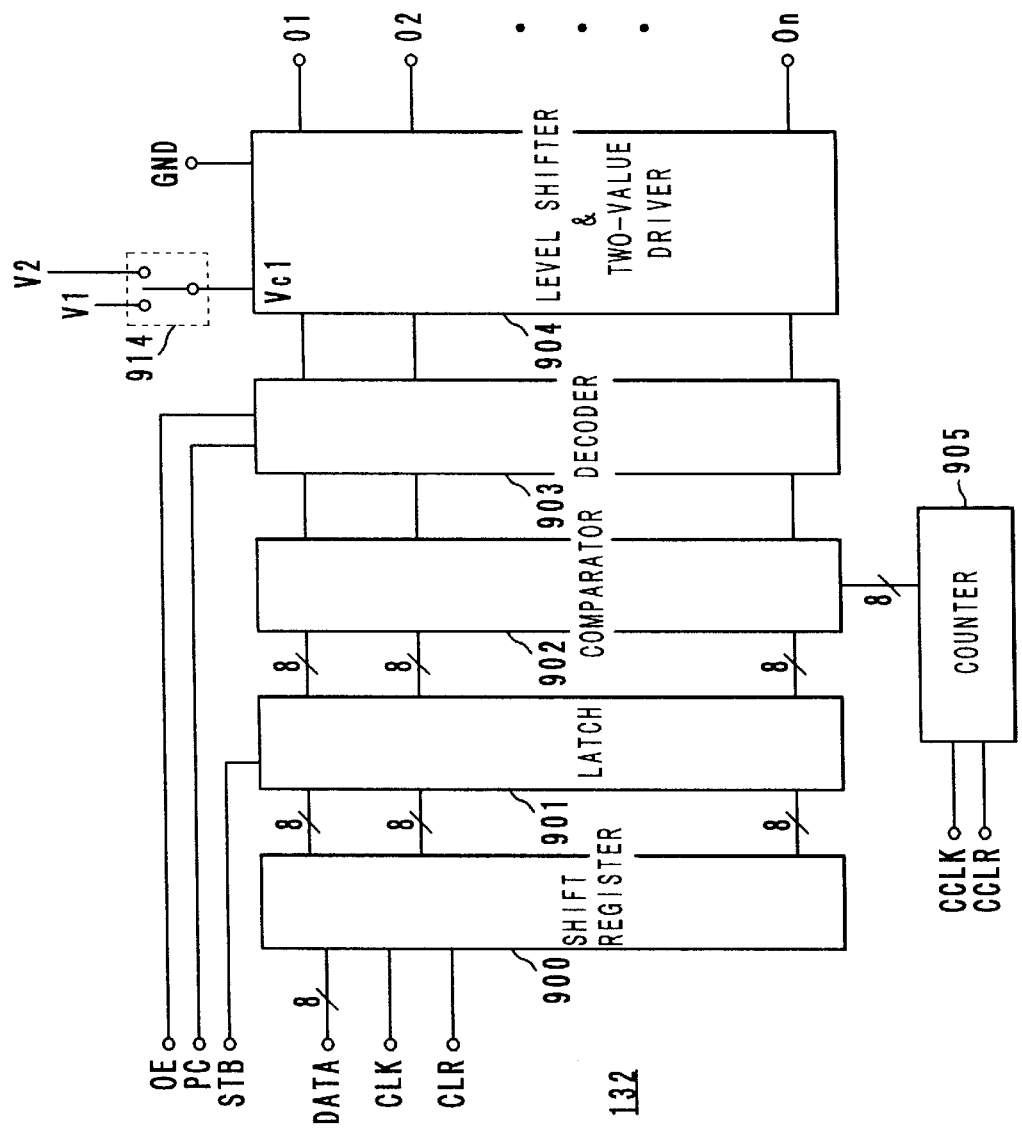
FIG. 12 is a block diagram which shows a data electrode driving IC used in the second example.

Exemplary Driving ICs for Second Example of Matrix Driving;

See FIGS. 11 and 12

FIG. 11 shows the internal circuit of the scan electrode driving IC 131 which outputs the waveforms shown in FIG. 10. The scan electrode driving IC 131 is basically of the same structure shown by FIG. 8, and further, a voltage switch circuit is provided so that the three-value driver can output five values. Specifically, the driving IC 131 comprises a shift register 800, a latch 801, a decoder 802, a level shiftter/three-value driver 803 with a high withstand voltage and analog switches 810 and 811. In the driving IC 131, a mode switch signal MODE and a polarity conversion signal PC are inputted to the decoder 804. A strobe signal STB is inputted to the latch 801. A data signal DATA, a shift clock signal CLK and a clear signal CLR are inputted to the shift register 800.

Operation of the scan electrode driving IC 131 is described. In response to the two-bit data signal DATA and the shift clock signal CLK, the shift register 800 sets two-bit data therein. Next, in response to the strobe signal STB, the data set in the shift register 800 is latched in the latch 801. In response to the polarity conversion signal PC and the mode switch signal MODE, the decoder 802 decodes the latched two-bit data signal DATA and drives the level shifter/three-value driver 803. The level shifter/three-value driver 803 outputs either one of the voltages Vr1, Vr2 and GND.

Each of the voltages Vr1 and Vr2 are switchable between V1 and V2 and between V½ and V⅔ by the analog switches 810 and 811, respectively, based on a signal sent from the LCD controller 136. By carrying out this switch in the selection step, it becomes possible to set the selection pulse to V2.

FIG. 12 shows the internal circuit of the data electrode driving IC 132 which outputs the waveform shown in FIG. 10. The data electrode driving IC 132 is basically of the same structure shown by FIG. 9. The driving IC 132 comprises a shift register 900, a latch 901, a comparator 902, a decoder 903, a level shifter/driver 904 with a high withstand voltage, a counter 905 and an analog switch 914. In the driving IC 132, an output evasion signal OE and a polarity conversion signal PC are inputted to the decoder 903. A strobe signal STB is inputted to the latch 901. An eight-bit data signal DATA, a shift clock signal CLK and a clear signal CLR are inputted to the shift register 900. A clock signal CCLK and a clear signal CCLR are inputted to the counter 905.

Operation of the data electrode driving IC 132 is described. Based on the eight-bit data signal DATA and the shift clock signal CLK inputted to the shift register 900, the shift register 900 sets eight-bit data therein. Next, in response to the strobe signal STB, the data set in the shift register 900 is latched in the latch 901. At this time, the counter 905 starts counting the output of the eight-bit data signal by using the clock signal CCLK. The comparator 902 compares the output of the latch 901 with the output of the counter 905. When the output of the latch 901 is larger, the comparator 902 outputs a high-level signal. The counter 905 counts further, and when the output of the latch 901 becomes smaller, the comparator 902 outputs a low-level signal. Based on the output of the comparator 902, the output evasion signal OE and the polarity conversion signal PC, the decoder 903 outputs a signal to drive the level shifter/driver 904.

The voltage Vc1 is switchable between V1 and V2 by the analog switch 914 based on a signal sent from the LCD controller 136. By carrying out this switch in the selection step, it is possible to set the selection pulse to V2.

Thus, by providing an analog switch which permits selection of a voltage from different voltages supplied from a plurality of power sources, outputs of three values or outputs of five values become possible merely by use of a two-value driver or a three-value driver. This prevents an increase in production cost.

Third Example of Matrix Driving; See FIG. 13

Figure 13:
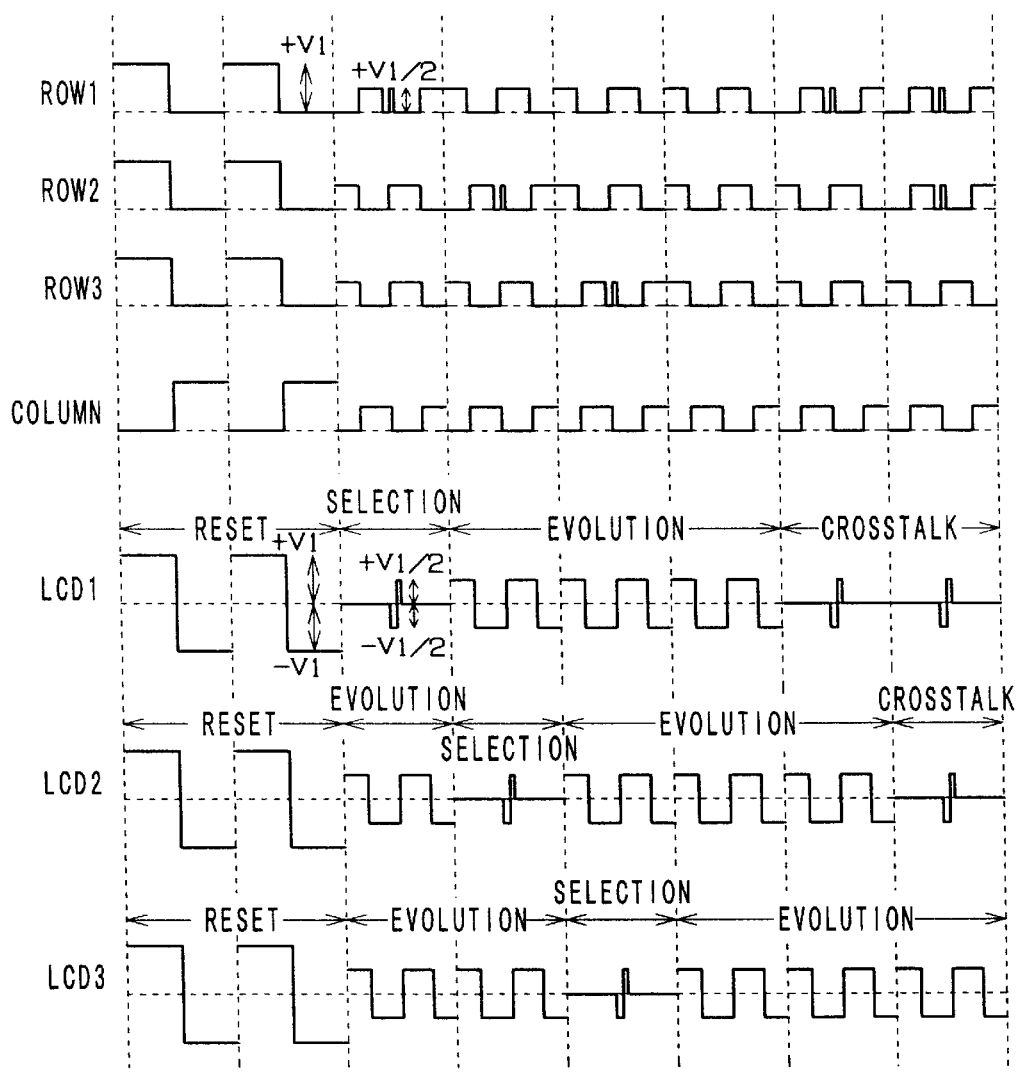
FIG. 13 is a chart which shows driving waveforms in a third driving example.

In the first and second examples, the scan electrodes are reset serially. The third example, however, adopts a total reset method in which all the scan electrodes in the area to be written are reset at one time. FIG. 13 shows driving waveforms in the third example. In this example, merely two-value drivers can be used for the scan electrode driving IC and for the data electrode driving IC by providing voltage switching means in each of the driving ICs.

First, the entire screen is once reset. At this time, the reset pulses ±Vr outputted from the driving ICs are of a voltage V1. Because this voltage is applied to the entire screen simultaneously, the voltages supplied to the driving ICs are set to V1. Then, for serial selection of the scan electrodes, the voltages supplied to the driving ICs are switched to V½.

While the LCD2 is in the pre-selection step, pulses which are of a voltage +V½ and are in phase with each other are applied to the ROW1 and the ROW3, and to the ROW2, a pulse of +V½ which is out of phase with the pulses applied to the ROW1 and the ROW3 is applied. At this time, a pulse which is of a voltage ±V½ and is in phase with the pulse applied to the ROW2 is applied to the COLUMN. Thereby, 0 volt is applied to the LCD2, and an evolution pulse of a voltage ±Ve=±V½ is applied to the LCD1 and the LCD3.

While the LCD2 is in the selection pulse application step, a pulse of a voltage +V½ is applied to the ROW1, the ROW2 and the ROW3. The voltage difference between a data pulse applied to the COLUMN and the voltage (±V½ or 0) is applied to the LCD2 as a selection pulse of a voltage ±Vse1. By changing the form of the data pulse applied to the COLUMN, the pulse width of the selection pulse can be changed.

In the post-selection step, application of pulses to the ROWS 1–3 and the COLUMN is carried out in the same way as in the pre-selection step.

In the steps other than the reset step, the selection step and the evolution step, pulses in phase with the data pulse applied to the data electrode in the pre-selection step and in the post-selection step are applied, and while any of the other scan electrodes is in the selection pulse application step, a pulse of a voltage +V½ is applied. Thereby, to the part of the liquid crystal corresponding to this pixel, a crosstalk voltage ±V½ with the same pulse width as that of the selection pulse is applied. The pulse width of this crosstalk voltage is too narrow to change the state of the liquid crystal.

By applying the above-described pulses to the scan electrodes repeatedly, an image can be displayed on the liquid crystal display. Off course, partial writing on the liquid crystal display is possible.

In the third example, the driving IC for the rows (scan electrodes) has three output levels (V1, V½ and GND), and the driving IC for the columns (data electrodes) has three output levels (V1, V½ and GND). The voltage V1 is necessary only for the reset of all the screen. Therefore, by using voltage switching means, e.g., an analog switch, as used in the second example, it becomes possible to switch the voltage supplied from a power source in the reset step and in the other steps. Thereby, in the reset step, the driving IC for the rows must have merely two output levels (V1 and GND), and the driving IC for the columns must have merely two output levels (V½ and GND). In the selection step, the driving IC for the rows must have merely two output levels (V½ and GND), and the driving IC for the columns must have merely two output levels (V½ and GND). Then, the cost for the drivers can be reduced more.

Fourth Example of Matrix Driving; See FIG. 14

FIG. 14 shows driving waveforms according to the fourth example to take a longer time to untwist the liquid crystal. In the fourth example, the selection step has a step of applying a pulse of a voltage ±V⅔, a step of applying a selection pulse of a voltage ±V2 and a step of applying a pulse of a voltage ±V⅔. The pulses of ±V⅔ are of the same voltage and of the same form as crosstalk, and the waveform applied to the scan electrode and the waveform applied to the data electrode in these steps are of the same as those in the crosstalk step. By applying these waveforms, in the selection step, the time in which 0 volt is applied to the liquid crystal is longer, and the time to untwist the liquid crystal is longer. In this case, because the time to select one line is shorter than the time to untwist the liquid crystal, it is possible to shorten the time for writing on the liquid crystal.

The driving ICs which has the circuits shown by FIGS. 8 and 9 can be used for the fourth example.

Test liquid crystal displays were fabricated by the inventors, and comparative experiments were conducted. In the following, the experiments will be described with reference to examples 1–6 and a comparative example 1.

EXAMPLE 1

To nematic liquid crystal which contains liquid crystalline ester compounds expressed by the formulas (A1), (A5), (A12), (A'4) and (A'13) at 40 wt %, a chiral agent S-811 (made by Merck & Company) was added at 22 wt %. Thus, a chiral nematic liquid crystal composition which selectively reflects light of wavelengths around 560 nm was prepared. With respect to this liquid crystal composition, the anisotropy of refractive index was 0.18, the anisotropy of dielectric constant was 20, and the transition temperature to isotropic phase was 80° C. Further, a coloring agent GN (made by Nippon Kayaku Co., Ltd.) was added to this liquid crystal composition at 0.6 wt %.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR Co., Ltd.) was formed to have a thickness of 800Å. The alignment controlling layer was not subjected to any rubbing treatments. On the alignment controlling layer, spacers with a particle diameter of 7.0 µm (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 µm between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:

in a reset step of a length of 50 ms, reset pulses which have a voltage of ±50V and a pulse width of 0.5 ms were applied;

in a selection step of a length of 0.5 ms, a selection pulse which has a voltage of ±30V and a pulse width of 0.1 ms was applied; and in an evolution step of a length of 50 ms, evolution pulses which have a voltage of ±20V and a pulse width of 0.5 ms were applied.

In result, the liquid crystal cell showed green. The Y value (luminous reflectance) was 24.9, and the peak reflectance was 36%.

On the other hand, in order to cause the liquid crystal cell to come to an uncolored state (focal-conic state), the following pulse voltages were applied:

in a reset step of a length of 50 ms, reset pulses which have a voltage of ±50V and a pulse width of 0.5 ms were applied;

in a selection step of a length of 0.5 ms, a selection pulse of 0V was applied; and in an evolution step of a length of 50 ms, evolution pulses which have a voltage of ±10V and a pulse width of 0.5 ms were applied.

In result, the liquid crystal cell showed black, and the Y value was 2.6. The contrast (the ratio of the Y value between the planar state and the focal-conic state) was 9.2, which was very high.

The Y value was measured by use of a spectrometer CM3700d (made by Minolta Co., Ltd.) which has a white light source. In the following experiments and control experiments, this spectrometer was used to measure the Y value.

EXAMPLE 2

To nematic liquid crystal which contains liquid crystalline stilbene compounds expressed by the formulas (B2), (B7), (B15), (B38) and (B50) at 30 wt %, a chiral agent S-811 (made by Merck & Company) was added at 20 wt %. Thus, a chiral nematic liquid crystal composition which selectively reflects light of wavelengths around 560 nm was prepared.

With respect to this liquid crystal composition, the anisotropy of refractive index was 0.17, the anisotropy of dielectric constant was 19, and the transition temperature to isotropic phase was 82° C. Further, a ultraviolet-ray absorber MBT175 (made by Nippon Kayaku Co., Ltd.) was added to this liquid crystal composition at 0.6 wt %.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR CO., Ltd.) was formed to have a thickness of 800Å. The alignment controlling layer was not subjected to any rubbing treatments. On the alignment controlling layer, spacers with a particle diameter of 7.0 µm (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 µm between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:

in a reset step of a length of 50 ms, reset pulses which have a voltage of ±48V and a pulse width of 0.5 ms were applied;

in a selection step of a length of 0.5 ms, a selection pulse which has a voltage of ±28V and a pulse width of 0.1 ms was applied; and in an evolution step of a length of 50 ms, evolution pulses which have a voltage of ±20V and a pulse width of 0.5 ms were applied.

In result, the liquid crystal cell showed green. The Y value (luminous reflectance) was 22.8, and the peak reflectance was 37%.

On the other hand, in order to cause the liquid crystal cell to come to an uncolored state (focal-conic state), the following pulse voltages were applied:

in a reset step of a length of 50 ms, reset pulses which have a voltage of ±48V and a pulse width of 0.5 ms were applied;

in a selection step of a length of 0.5 ms, a selection pulse of 0V was applied; and in an evolution step of a length of 50 ms, evolution pulses which have a voltage of ±10V and a pulse width of 0.5 ms were applied.

In result, the liquid crystal cell showed black, and the Y value was 2.5. The contrast (the ratio of the Y value between the planar state and the focal-conic state) was 9.1, which was very high.

EXAMPLE 3

To nematic liquid crystal which contains liquid crystalline tarphenyl compounds expressed by the formulas (C1), (C7), (C19), (C26) and (C39) at 35 wt %, a chiral agent S-811 (made by Merck & Company) was added at 20 wt %. Thus, a chiral nematic liquid crystal composition which selectively reflects light of wavelengths around 560 nm was prepared. With respect to this liquid crystal composition, the anisotropy of refractive index was 0.19, the anisotropy of dielectric constant was 18, and the transition temperature to isotropic phase was 88° C.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR CO., Ltd.) was formed to have a thickness of 800Å. The alignment controlling layer was not subjected to any rubbing treatments. On the alignment controlling layer, spacers with a particle diameter of 7.0 $\mu$m (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 $\mu$m between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:

in a reset step of a length of 50 ms, reset pulses which have a voltage of ±52V and a pulse width of 0.5 ms were applied;

in a selection step of a length of 0.5 ms, a selection pulse which has a voltage of ±33V and a pulse width of 0.1 ms was applied; and in an evolution step of a length of 50 ms, evolution pulses which have a voltage of ±25V and a pulse width of 0.5 ms were applied.

In result, the liquid crystal cell showed green. The Y value (luminous reflectance) was 25.5, and the peak reflectance was 37%.

On the other hand, in order to cause the liquid crystal cell to come to an uncolored state (focal-conic state), the following pulse voltages were applied:

in a reset step of a length of 50 ms, reset pulses which have a voltage of ±52V and a pulse width of 0.5 ms were applied;

in a selection step of a length of 0.5 ms, a selection pulse of 0V was applied; and in an evolution step of a length of 50 ms, evolution pulses which have a voltage of ±12V and a pulse width of 0.5 ms were applied.

In result, the liquid crystal cell showed black, and the Y value was 3.4. The contrast (the ratio of the Y value between the planar state and the focal-conic state) was 7.5, which was very high.

EXAMPLE 4

To nematic liquid crystal which contains liquid crystalline tolane compounds expressed by the formulas (D2), (D17), (D29), (D42) and (D64) at 32 wt %, a chiral agent S-811 (made by Merck & Company) was added at 20 wt %. Thus, a chiral nematic liquid crystal composition which selectively reflects light of wavelengths around 560 nm was prepared. With respect to this liquid crystal composition, the anisotropy of refractive index was 0.20, the anisotropy of dielectric constant was 12, and the transition temperature to isotropic phase was 85° C.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR CO., Ltd.) was formed to have a thickness of 800Å. The alignment controlling layer was not subjected to any rubbing treatments. On the alignment controlling layer, spacers with a particle diameter of 7.0 $\mu$m (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 $\mu$m between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:

in a reset step of a length of 50 ms, reset pulses which have a voltage of ±55V and a pulse width of 0.5 ms were applied;

in a selection step of a length of 0.5 ms, a selection pulse which has a voltage of ±30V and a pulse width of 0.1 ms was applied; and in an evolution step of a length of 50 ms, evolution pulses which have a voltage of ±20V and a pulse width of 0.5 ms were applied.

In result, the liquid crystal cell showed green. The Y value (luminous reflectance) was 25.5, and the peak reflectance was 35%.

On the other hand, in order to cause the liquid crystal cell to come to an uncolored state (focal-conic state), the following pulse voltages were applied:

in a reset step of a length of 50 ms, reset pulses which have a voltage of ±55V and a pulse width of 0.5 ms were applied;

in a selection step of a length of 0.5 ms, a selection pulse of 0V was applied; and in an evolution step of a length of 50 ms, evolution pulses which have a voltage of ±10V and a pulse width of 0.5 ms were applied.

In result, the liquid crystal cell showed black, and the Y value was 3.2. The contrast (the ratio of the Y value between the planar state and the focal-conic state) was 8.0, which was very high.

EXAMPLE 5

To nematic liquid crystal which contains liquid crystalline ester compounds expressed by the formulas (A6), (A27), (A35), (A'21) and (A'39) at 20 wt % and liquid crystalline tolane compounds expressed by the formulas (D3), (D13), and (D45) at 25 wt %, a chiral agent S-811 (made by Merck & Company) was added at 26 wt %. Thus, a chiral nematic liquid crystal composition which selectively reflects light of wavelengths around 560 nm was prepared. With respect to this liquid crystal composition, the anisotropy of refractive index was 0.18, the anisotropy of dielectric constant was 21, and the transition temperature to isotropic phase was 85° C.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR CO., Ltd.) was formed to have a thickness of 800Å. The alignment controlling layer was not subjected to any rubbing treatments. On the alignment controlling layer, spacers with a particle diameter of 7.0 $\mu$m (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 $\mu$m between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:
in a reset step of a length of 50 ms, reset pulses which have a voltage of ±45V and a pulse width of 0.5 ms were applied;
in a selection step of a length of 0.5 ms, a selection pulse which has a voltage of ±23V and a pulse width of 0.1 ms was applied; and
in an evolution step of a length of 50 ms, evolution pulses which have a voltage of ±20V and a pulse width of 0.5 ms were applied.

In result, the liquid crystal cell showed green. The Y value (luminous reflectance) was 24.0, and the peak reflectance was 36%.

On the other hand, in order to cause the liquid crystal cell to come to an uncolored state (focal-conic state), the following pulse voltages were applied:
in a reset step of a length of 50 ms, reset pulses which have a voltage of ±45V and a pulse width of 0.5 ms were applied;
in a selection step of a length of 0.5 ms, a selection pulse of 0V was applied; and
in an evolution step of a length of 50 ms, evolution pulses which have a voltage of ±10V and a pulse width of 0.5 ms were applied.

In result, the liquid crystal cell showed black, and the Y value was 2.5. The contrast (the ratio of the Y value between the planar state and the focal-conic state) was 9.6, which was very high.

EXAMPLE 6

To nematic liquid crystal which contains liquid crystalline ester compounds expressed by the formulas (A14), (A'8) and (A'33) at 15 wt %, liquid crystalline tarphenyl compounds expressed by the formulas (C8) and (C20) at 14 wt % and liquid crystalline tolane compounds expressed by the formulas (D1), (D12) and (D43) at 15 wt %, a chiral agent S-811 (made by Merck & Company) was added at 30 wt %. Thus, a chiral nematic liquid crystal composition which selectively reflects light of wavelengths around 560 nm was prepared. With respect to this liquid crystal composition, the anisotropy of refractive index was 0.20, the anisotropy of dielectric constant was 19, and the transition temperature to isotropic phase was 88° C.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR CO., Ltd.) was formed to have a thickness of 800Å. The alignment controlling layer was not subjected to any rubbing treatments. On the alignment controlling layer, spacers with a particle diameter of 7.0 $\mu$m (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 $\mu$m between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:
in a reset step of a length of 50 ms, reset pulses which have a voltage of ±40V and a pulse width of 0.5 ms were applied;
in a selection step of a length of 0.5 ms, a selection pulse which has a voltage of ±20V and a pulse width of 0.1 ms was applied; and
in an evolution step of a length of 50 ms, evolution pulses which have a voltage of ±20V and a pulse width of 0.5 ms were applied.

In result, the liquid crystal cell showed green. The Y value (luminous reflectance) was 23.5, and the peak reflectance was 37%.

On the other hand, in order to cause the liquid crystal cell to come to an uncolored state (focal-conic state), the following pulse voltages were applied:
in a reset step of a length of 50 ms, reset pulses which have a voltage of ±40V and a pulse width of 0.5 ms were applied;
in a selection step of a length of 0.5 ms, a selection pulse of 0V was applied; and
in an evolution step of a length of 50 ms, evolution pulses which have a voltage of ±20V and a pulse width of 0.5 ms were applied.

In result, the liquid crystal cell showed black, and the Y value was 2.5. The contrast (the ratio of the Y value between the planar state and the focal-conic state) was 9.4, which was very high.

COMPARATIVE EXAMPLE 1

To nematic liquid crystal which contains liquid crystalline cyano biphenyl compound E44 (made by Merck & Company) at 100 wt %, a chiral agent S-811 (made by Merck & Company) was added at 22 wt %. Thus, a chiral nematic liquid crystal composition which selectively reflects light of wavelengths around 560 nm was prepared. With respect to this liquid crystal composition, the anisotropy of refractive index was 0.18, the anisotropy of dielectric constant was 20, and the transition temperature to isotropic phase was 75° C.

Next, on the surface with electrodes thereon of a first polycarbonate film, an insulating layer of HIM3000 (made by Hitachi Kasei Co., Ltd.) was formed to have a thickness of 1000Å. On the insulating layer, an alignment controlling layer of AL4552 (made by JSR CO., Ltd.) was formed to have a thickness of 800Å. The alignment controlling layer was not subjected to any rubbing treatments. On the alignment controlling layer, spacers with a particle diameter of 7.0 μm (made by Sekisui Finechemical Co., Ltd.) were dispersed. In the same way, an insulating layer and an alignment controlling layer were formed on the surface with electrodes thereon of a second polycarbonate film.

Next, on the first film, a sealant XN21S (made by Mitsui Kagaku Co., Ltd.) was screen-printed along the sides, so that a wall of a specified height was made. An amount of the above-described liquid crystal composition, which was calculated from the height of the sealant and the area of the first film enclosed by the sealant, was coated on the first film. Then, the first and second films were laminated together by use of a laminating device and heated at 150° C. for one hour. A liquid crystal cell which was fabricated in this way had a gap of 7 μm between the first and second films and had a liquid crystal composition filled in the gap. Further, on the back side of the liquid crystal cell, a black light absorbing layer was provided.

In order to cause the liquid crystal cell to come to a colored state (planar state), the following pulse voltages were applied:

- in a reset step of a length of 50 ms, reset pulses which have a voltage of ±65V and a pulse width of 3 ms were applied;
- in a selection step of a length of 3 ms, a selection pulse which has a voltage of ±55V and a pulse width of 0.6 ms was applied; and
- in an evolution step of a length of 50 ms, evolution pulses which have a voltage of ±30V and a pulse width of 3 ms were applied.

In result, the liquid crystal cell showed green. The Y value (luminous reflectance) was 24.0, and the peak reflectance was 29%.

On the other hand, in order to cause the liquid crystal cell to come to an uncolored state (focal-conic state), the following pulse voltages were applied:

- in a reset step of a length of 50 ms, reset pulses which have a voltage of ±65V and a pulse width of 3 ms were applied;
- in a selection step of a length of 3 ms, a selection pulse of 0V was applied; and
- in an evolution step of a length of 50 ms, evolution pulses which have a voltage of ±30V and a pulse width of 3 ms were applied.

In result, the liquid crystal cell showed black, and the Y value was 4.8. The contrast (the ratio of the Y value between the planar state and the focal-conic state) was 5.0, which was not so high. The length of the selection step and the pulse width of the selection pulse were approximately six times as long as those in the above-described examples.

Other Embodiments

The structure, the materials, the producing method of the liquid crystal display and the structure of the driving circuit are arbitrary. The liquid crystal display may be of a laminate structure but is not necessarily of the three-layered structure in which an R layer, a G layer and a B layer are laminated together.

Although the present invention has been described with reference to the preferred embodiments above, it is to be noted that various changes and modifications are possible to those who are skilled in the art. Such changes and modifications are to be understood as being within the scope of the present invention.

What is claimed is:

1. A liquid crystal display which carries out matrix driving of a chiral nematic liquid crystal composition, which contains nematic liquid crystal and at least one kind of chiral agent and which is capable of displaying an image thereon continuously after an electric field applied thereto has been turned off, by applying an electric field to the nematic liquid crystal composition through a plurality of scan electrodes and a plurality of data electrodes which face and cross each other with the liquid crystal composition in-between, said liquid crystal display comprising:

a driving section for driving the liquid crystal composition by a driving method which comprises a reset step of applying a reset pulse to cause the liquid crystal composition to come to a homeotropic state, a selection step of applying a selection pulse to select a final state of the liquid crystal composition and an evolution step of applying an evolution pulse to cause the liquid crystal composition to evolve to the selected final state and in which the selection of the final state of the liquid crystal composition is carried out by modulating the selection pulse;

wherein the nematic liquid crystal contains a liquid crystalline compound which is expressed by the following formula (A) or (A')

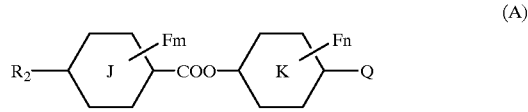

(A)

$R_2$: alkyl group, alkoxyl group, alkenyl group or fluoroalkyl group

Q: alkyl group, alkoxyl group, alkenyl group, cyano group, fluorine atom or fluoroalkyl group J, K: 1, 4-phenylene group or 1, 4-cyclohexylene group m, n: integer from 0 to 4

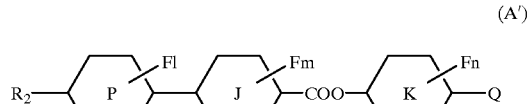

(A')

$R_2$: alkyl group, alkoxyl group, alkenyl group or fluoroalkyl group

Q: alkyl group, alkoxyl group, alkenyl group, cyano group, fluorine atom or fluoroalkyl group J, K, P: 1, 4-phenylene group or 1, 4-cyclohexylene group l, m, n: integer from 0 to 4.

2. The liquid crystal display according to claim 1, wherein the driving method executed by the driving section comprises, in the selection step, before and after the application of the selection pulse, a time of applying substantially zero volts to the liquid crystal composition.

3. The liquid crystal display according to claim 1, wherein the chiral agent is contained in a range from 10 wt % to 40 wt % of the chiral nematic liquid crystal composition.

4. The liquid crystal display according to claim 1, wherein the liquid crystal composition further contains a coloring agent.

5. The liquid crystal display according to claim 1, wherein the liquid crystal composition further contains an ultraviolet-ray absorber.

6. A liquid crystal display which carries out matrix driving of a chiral nematic liquid crystal composition, which contains nematic liquid crystal and at least one kind of chiral agent and which is capable of displaying an image thereon continuously after an electric field applied thereto has been turned off, by applying an electric field to the nematic liquid crystal composition through a plurality of scan electrodes and a plurality of data electrodes which face and cross each other with the liquid crystal composition in-between, said liquid crystal display comprising:

a driving section for driving the liquid crystal composition by a driving method which comprises a reset step of applying a reset pulse to cause the liquid crystal composition to come to a homeotropic state, a selection step of applying a selection pulse to select a final state of the liquid crystal composition and an evolution step of applying an evolution pulse to cause the liquid crystal composition to evolve to the selected final state and in which the selection of the final state of the liquid crystal composition is carried out by modulating the selection pulse;

wherein the nematic liquid crystal contains a liquid crystalline compound which is expressed by the following formula (B)

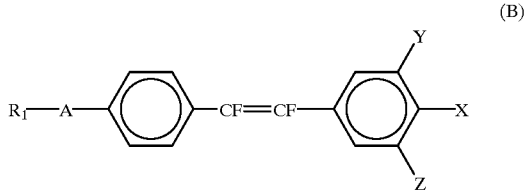

(B)

$R_1$: alkyl group with 1 to 10 carbons or alkenyl group with 2 to 10 carbons

A: single bond or 1, 4-cyclohexylene group

X: —F, —Cl or —CN

Y, Z: —F or —H.

7. The liquid crystal display according to claim 6, wherein the driving method executed by the driving section comprises, in the selection step, before and after the application of the selection pulse, a time of applying substantially zero volts to the liquid crystal composition.

8. The liquid crystal display according to claim 6, wherein the chiral agent is contained in a range from 10 wt % to 40 wt % of the chiral nematic liquid crystal composition.

9. The liquid crystal display according to claim 6, wherein the liquid crystal composition further contains a coloring agent.

10. The liquid crystal display according to claim 6, wherein the liquid crystal composition further contains an ultraviolet-ray absorber.

11. A liquid crystal display which carries out matrix driving of a chiral nematic liquid crystal composition, which contains nematic liquid crystal and at least one kind of chiral agent and which is capable of displaying an image thereon continuously after an electric field applied thereto has been turned off, by applying an electric field to the nematic liquid crystal composition through a plurality of scan electrodes and a plurality of data electrodes which face and cross each other with the liquid crystal composition in-between, said liquid crystal display comprising:

a driving section for driving the liquid crystal composition by a driving method which comprises a reset step of applying a reset pulse to cause the liquid crystal composition to come to a homeotropic state, a selection step of applying a selection pulse to select a final state of the liquid crystal composition and an evolution step of applying an evolution pulse to cause the liquid crystal composition to evolve to the selected final state and in which the selection of the final state of the liquid crystal composition is carried out by modulating the selection pulse;

wherein the nematic liquid crystal contains a liquid crystalline compound which is expressed by the following formula (C)

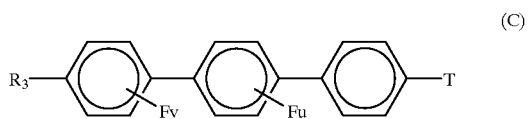

(C)

$R_3$: alkyl group, alkoxyl group or alkenyl group

T: cyano group, halogen atom, alkyl group or alkoxyl group v, u: integer from 0 to 4.

12. The liquid crystal display according to claim 11, wherein the driving method executed by the driving section comprises, in the selection step, before and after the application of the selection pulse, a time of applying substantially zero volts to the liquid crystal composition.

13. The liquid crystal display according to claim 11, wherein the chiral agent is contained in a range from 10 wt % to 40 wt % of the chiral nematic liquid crystal composition.

14. The liquid crystal display according to claim 11, wherein the liquid crystal composition further contains a coloring agent.

15. The liquid crystal display according to claim 11, wherein the liquid crystal composition further contains an ultraviolet-ray absorber.

16. A liquid crystal display which carries out matrix driving of a chiral nematic liquid crystal composition, which contains nematic liquid crystal and at least one kind of chiral agent and which is capable of displaying an image thereon continuously after an electric field applied thereto has been turned off, by applying an electric field to the nematic liquid crystal composition through a plurality of scan electrodes and a plurality of data electrodes which face and cross each other with the liquid crystal composition in-between, said liquid crystal display comprising:

a driving section for driving the liquid crystal composition by a driving method which comprises a reset step of applying a reset pulse to cause the liquid crystal composition to come to a homeotropic state, a selection step of applying a selection pulse to select a final state of the liquid crystal composition and an evolution step of applying an evolution pulse to cause the liquid crystal composition to evolve to the selected final state and in which the selection of the final state of the liquid crystal composition is carried out by modulating the selection pulse;

wherein the nematic liquid crystal contains a liquid crystalline compound which is expressed by the following formula (D).

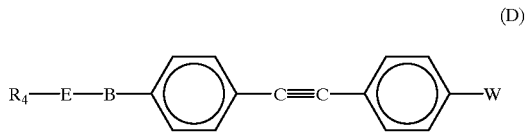

$R_4$: alkyl group or alkoxyl group
W: alkyl group, alkoxyl group, fluorine atom fluoroalkyl group or fluoroalkoxyl group
B: 1, 4-phenylene group, 1, 4-cyclohexylene group or single bond
E: 1, 4-cyclohexylene group or single bond.

17. The liquid crystal display according to claim 16, wherein the driving method executed by the driving section comprises, in the selection step, before and after the application of the selection pulse, a time of applying substantially zero volts to the liquid crystal composition.

18. The liquid crystal display according to claim 16, wherein the chiral agent is contained in a range from 10 wt % to 40 wt % of the chiral nematic liquid crystal composition.

19. The liquid crystal display according to claim 16, wherein the liquid crystal composition further contains a coloring agent.

20. The liquid crystal display according to claim 16, wherein the liquid crystal composition further contains an ultraviolet-ray absorber.

* * * * *